(12) United States Patent
Yagiura

(10) Patent No.: US 10,244,037 B2
(45) Date of Patent: Mar. 26, 2019

(54) APPARATUS, SYSTEM, AND METHOD OF PROCESSING A JOB REQUEST

(71) Applicant: Yutaka Yagiura, Kanagawa (JP)

(72) Inventor: Yutaka Yagiura, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 520 days.

(21) Appl. No.: 13/857,497

(22) Filed: Apr. 5, 2013

(65) Prior Publication Data

US 2013/0268624 A1 Oct. 10, 2013

(30) Foreign Application Priority Data

Apr. 9, 2012 (JP) .................................. 2012-088125

(51) Int. Cl.
G06F 15/16 (2006.01)
H04L 29/08 (2006.01)
G06F 3/12 (2006.01)

(52) U.S. Cl.
CPC ............ *H04L 67/10* (2013.01); *H04L 67/025* (2013.01); *G06F 3/1222* (2013.01);
(Continued)

(58) Field of Classification Search
CPC ... H04L 67/025; H04L 41/12; H04L 41/0213; H04L 12/24; H04L 41/00; H04L 41/0226;
(Continued)

(56) References Cited

U.S. PATENT DOCUMENTS 8,610,935 B1 * 12/2013 McKinley et al. ........... 358/1.15
2003/0197887 A1 * 10/2003 Shenoy ................. G06F 3/1205
358/1.15
(Continued)

FOREIGN PATENT DOCUMENTS

CN 101287052 A 10/2008
CN 101499945 A 8/2009
(Continued)

OTHER PUBLICATIONS

Combined Chinese Office Action and Search Report dated Apr. 3, 2015 in Patent Application No. 201310132614.0 (with English translation of categories of cited documents).
(Continued)

*Primary Examiner* — Jungwon Chang
(74) *Attorney, Agent, or Firm* — Oblon, McCelland, Maier & Neustadt, L.L.P.

(57) ABSTRACT

A server apparatus or system is connected to an operation apparatus provided on a first network and to one or more electronic apparatuses provided on a second network. In response to a processing request regarding a process to be executed using one of one or more electronic apparatuses, the server apparatus or system stores a processing request in association with identification information for identifying the electronic apparatus to be used for executing the process. The identification information is being obtained by the operation apparatus directly or indirectly from the electronic apparatus, and sent to the server. In response to a request received from the electronic apparatus to be used for executing the process, the server sends information relating to the processing request associated with the identification information for identifying the electronic apparatus to the electronic apparatus that send the request.

19 Claims, 16 Drawing Sheets

(52) U.S. Cl.
CPC .......... *G06F 3/1228* (2013.01); *G06F 3/1265* (2013.01); *G06F 3/1267* (2013.01); *G06F 3/1268* (2013.01); *G06F 3/1285* (2013.01); *G06F 3/1287* (2013.01); *G06F 3/1288* (2013.01); *G06F 3/1292* (2013.01)

(58) Field of Classification Search
CPC ............. H04L 41/0253; H04L 41/0293; H04L 41/0853; H04L 67/125; H04L 12/2602; H04L 41/0813; H04L 41/0816; H04L 43/00; H04L 67/10; G06F 3/1292; G06F 3/1228; G06F 3/1222; G06F 3/1268; G06F 3/1288; G06F 21/31; G06F 21/43; G06F 3/1204; G06F 3/1205; G06F 3/1285; G06F 3/1287; G06F 3/1267; G06F 3/1265; G03G 15/5004; G03G 15/5075; G06K 15/0005
USPC ...... 382/115; 358/1.13, 1.15, 1.14; 715/740; 709/220, 217; 399/8
See application file for complete search history.

(56) References Cited

U.S. PATENT DOCUMENTS

| | | | |
|---|---|---|---|
| 2005/0253889 A1* | 11/2005 | Shozaki | G06F 21/608 347/19 |
| 2007/0019232 A1* | 1/2007 | Kano | H04N 1/00307 358/1.15 |
| 2007/0110492 A1* | 5/2007 | Watanabe | G06F 3/1204 400/62 |
| 2007/0133843 A1* | 6/2007 | Nakatani | 382/115 |
| 2007/0297666 A1 | 12/2007 | Takeuchi et al. | |
| 2009/0051958 A1* | 2/2009 | Ito | G03G 15/5004 358/1.14 |
| 2010/0185858 A1 | 7/2010 | Nishimi et al. | |
| 2010/0309510 A1* | 12/2010 | Hansen | 358/1.15 |
| 2011/0085196 A1* | 4/2011 | Liu | G06F 3/1204 358/1.15 |
| 2011/0239123 A1* | 9/2011 | Tsujimoto | 715/740 |
| 2012/0002239 A1* | 1/2012 | Okamura | G06K 15/005 358/1.15 |
| 2012/0002980 A1* | 1/2012 | Tse | G03G 15/5075 399/8 |
| 2012/0079081 A1* | 3/2012 | Parks | G06F 3/1204 709/220 |
| 2012/0212758 A1* | 8/2012 | Eom | G06F 3/1204 358/1.13 |
| 2012/0268768 A1* | 10/2012 | Nakashima | 358/1.13 |
| 2013/0021638 A1* | 1/2013 | Hong | G06F 3/1204 358/1.14 |
| 2013/0021643 A1* | 1/2013 | Nuggehalli | H04N 1/00331 358/1.15 |
| 2013/0083337 A1* | 4/2013 | Tecu | G06F 3/1204 358/1.13 |
| 2013/0194623 A1* | 8/2013 | Tecu | G06F 3/1204 358/1.15 |
| 2014/0368865 A1* | 12/2014 | Gutnik | G06F 3/1222 358/1.15 |

FOREIGN PATENT DOCUMENTS

| | | |
|---|---|---|
| CN | 101673113 A | 3/2010 |
| CN | 101794367 A | 8/2010 |
| JP | 2006-185399 | 7/2006 |
| JP | 2007-108973 | 4/2007 |
| JP | 2007-164448 | 6/2007 |
| JP | 2007-257179 | 10/2007 |
| JP | 2007-306100 A | 11/2007 |
| JP | 2011-198017 A | 10/2011 |

OTHER PUBLICATIONS

Office Action dated Oct. 13, 2015 in Chinese Patent Application No. 201310132614.0.
JPO Communication dated Mar. 8, 2016 in corresponding JP Patent Application No. 2012-088125 (3 pgs.).

* cited by examiner

FIG. 10

| SESSION ID | EXPIRATION DATE | PATH WHERE JOB AND ENTITY DATA ARE STORED |
|---|---|---|
| xxxxxxxx-xxxx-xxxx-xxxx-xxxxxxxxxxxx | xx/xx/20xx | C:¥job¥xxxxxxxx-xxxx-xxxx-xxxx-xxxxxxxxxxxx.xxx |
| xxxxxxxx-xxxx-xxxx-xxxx-xxxxxxxxxxxx | xx/xx/20xx | C:¥job¥xxxxxxxx-xxxx-xxxx-xxxx-xxxxxxxxxxxx.xxx |
| xxxxxxxx-xxxx-xxxx-xxxx-xxxxxxxxxxxx | xx/xx/20xx | C:¥job¥xxxxxxxx-xxxx-xxxx-xxxx-xxxxxxxxxxxx.xxx |
| xxxxxxxx-xxxx-xxxx-xxxx-xxxxxxxxxxxx | xx/xx/20xx | C:¥job¥xxxxxxxx-xxxx-xxxx-xxxx-xxxxxxxxxxxx.xxx |
| xxxxxxxx-xxxx-xxxx-xxxx-xxxxxxxxxxxx | xx/xx/20xx | C:¥job¥xxxxxxxx-xxxx-xxxx-xxxx-xxxxxxxxxxxx.xxx |
| ... | ... | ... |

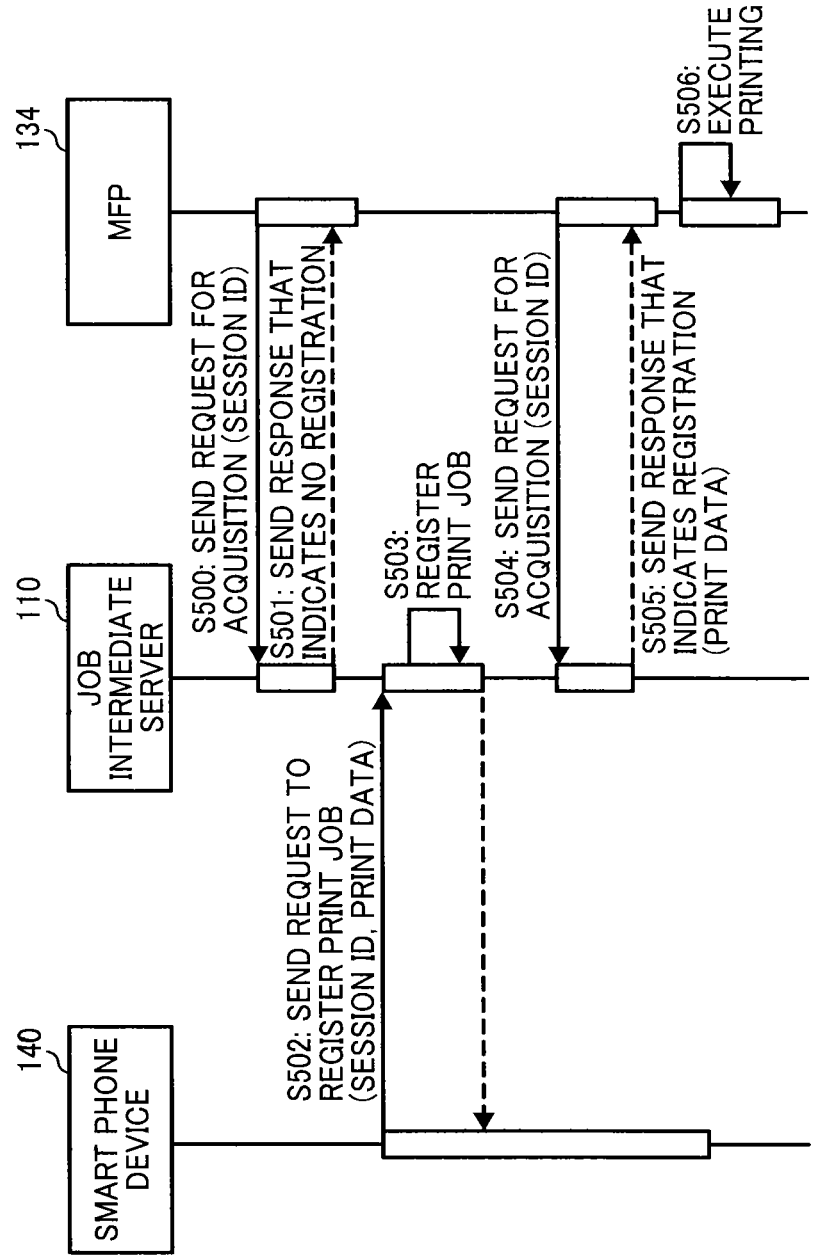

APPARATUS, SYSTEM, AND METHOD OF PROCESSING A JOB REQUEST

CROSS-REFERENCE TO RELATED APPLICATION

This patent application is based on and claims priority pursuant to 35 U.S.C. § 119 to Japanese Patent Application No. 2012-088125, filed on Apr. 9, 2012 in the Japan Patent Office, the entire disclosure of which is hereby incorporated by reference herein.

BACKGROUND

Technical Field

The present invention relates to network communications technology, and more particularly to a server apparatus or system, a request processing system, and a request processing method each of which is capable of processing a request requested by an operation apparatus for an electronic apparatus, and a non-transitory recording medium storing a processing request control program.

Background Art

If an electronic device is connected to a Local Area Network (LAN), an Internet Protocol (IP) address is allocated to the electronic device automatically using a protocol called Dynamic Host Configuration Protocol (DHCP). In using DHCP, an IP address allocated to the electronic device is not always the same each time the electronic device communicates. Therefore, when a user requests an electronic device such as a Multi Functional Peripheral (MFP) to print from a terminal via the network, the user needs to check if the destination IP address of the request is correct and modify it if necessary.

To make the checking of the IP address easy, it is known to display connecting information such as the IP address used for connecting via a network on an easily visible control panel. Further, the connecting information such as the IP address may be displayed as a two-dimensional code readable by a camera or a scanner, etc. instead of being displayed as is on a control panel to be scanned.

For example, JP-2007-164448-A proposes an operational system including a MIP with a Web server function, and a cell phone with a Web browser function. In this operational system, if the MFP recognizes that a user is present nearby using a user recognition unit, the MFP generates an identification code and displays it on an identification code displaying unit after converting it to a QR code. When the MFP receives an instruction designating specific operation via an operation unit, the cell phone inputs the displayed QR code using an identification code input unit and accesses the MFP specified by a URL acquired by decoding the input QR code. Subsequently, the cell phone sends operation information that indicates the designated operation and the identification code acquired by decoding the input QR code. If the received identification code matches the displayed identification code, the MFP processes the operation indicated by the received operation information.

JP-2007-257179-A proposes a service providing system including a terminal, a server apparatus, and a mobile communication device. In this service providing system, the mobile communication device reads terminal identification information from a barcode using a camera unit or a barcode decoder and sends the terminal identification information to the server apparatus. The mobile communication device further sends content data such as a list of mail and mail body to the server apparatus in response to a request from the server apparatus. The server apparatus transfers the content data sent from the mobile communication device to the terminal.

Yet another technology of a printing system that provides service to print data from a mobile information device via a network has been proposed, for example, in JP-2006-185399-A. In this printing system, a service providing server issues a one-time ID and instructs a printing apparatus to print a two-dimensional code for commanding to print by using specified printing method designating the one-time ID. After reading this two-dimensional code, the mobile information device generates information for commanding to print and sends it to the service providing server via an e-mail requesting to print. After receiving the request to print, the service providing server generates a print image of digital image data obtained from the e-mail, sends it to the printing apparatus, and commands the printing apparatus to print.

In conventional technologies described above, a terminal can command an electronic apparatus to process a request via a network using an identification code such as a two-dimensional code. However, it is based on presumption that a terminal can access a target electronic device directly. Thus, these conventional technologies would not be available if electronic devices and terminals belong to different networks and direct communication cannot be established. While DHCP described above can establish communication between nodes that belong to the same network, the DHCP cannot establish communication directly between nodes that belong to different networks connected via a router, usually due to a firewall placed between the nodes belonging to the different networks.

In the technology described in JP-2007-164448-A, the MFP includes a Web server function, and it is assumed that direct communication between the mobile information device and the MFP via the network is established. However, in a typical corporate intranet, access to MFP inside the intranet from external global network is usually prohibited. In the technology described in JP-2007-257179-A, the server apparatus that receives requests from the terminal needs to request the mobile communication device to send the content data and transfer the content data sent from the mobile communication device to the terminal. The cell phone needs to have the ability to send content data to the server apparatus in response to requests issued by the server apparatus. In the technology described in JP-2006-185399-A, it is necessary to configure the printing apparatus so that it can receive the command to print from the service providing server that receives requests from the mobile information device.

Therefore, a technology that can construct an environment in which the terminal can send requests to command the electronic device has been desired, even in an environment in which the electronic device and the terminal belong to different networks and the terminal cannot directly communicate with the electronic device.

SUMMARY

One aspect of the present invention is to provide a server apparatus or system, a request processing system, and a request processing method, each of which is capable of processing a request by an operation apparatus such as a terminal device for an electronic apparatus even when the operation apparatus and the electronic apparatus respectively belong to different networks.

For example, a server, such as a server apparatus or system, is connected to an operation apparatus provided on a first network and to one or more electronic apparatuses provided on a second network. In response to a processing request regarding a process to be executed using one of one or more electronic apparatuses, the server apparatus or system stores a processing request in association with identification information for identifying the electronic apparatus to be used for executing the process. The identification information is being obtained by the operation apparatus directly or indirectly from the electronic apparatus, and sent to the server. In response to a request received from the electronic apparatus to be used for executing the process, the server sends information relating to the processing request associated with the identification information for identifying the electronic apparatus to the electronic apparatus that send the request.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 10 is a diagram illustrating a data structure of a session management table managed by a session management unit of the job processing system of FIG. 1 or 2 as an embodiment.

FIG. 11 is a data sequence diagram illustrating operation of executing a print job as an embodiment.

DETAILED DESCRIPTION

Figure 1:
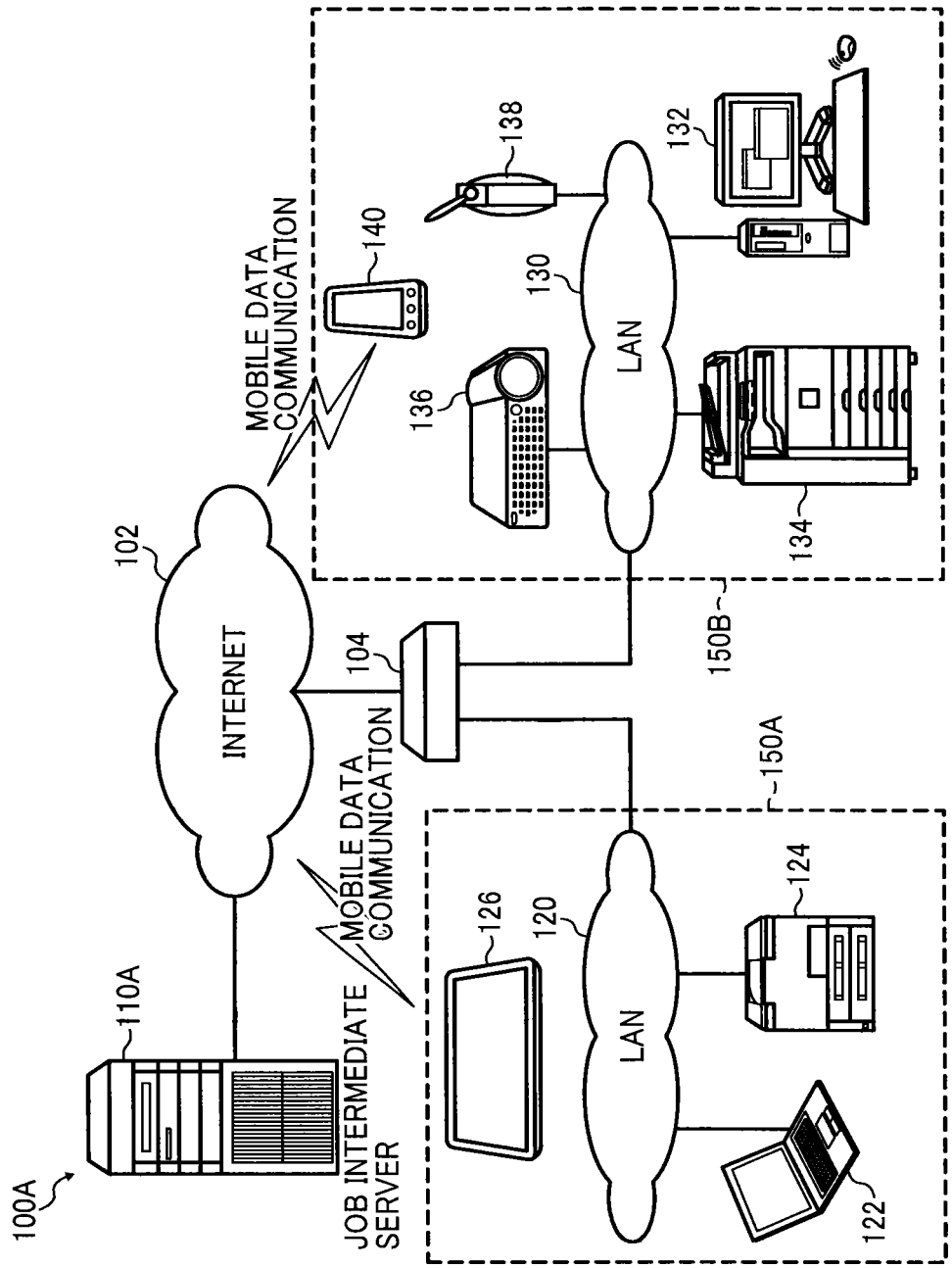
FIG. 1 is a schematic diagram illustrating a network environment of a job processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the accompanied drawings, example embodiments of a request processing system that processes a request will be described in detail below. In this example of the request processing system, a MFP and a projector are used as examples of electronic devices or apparatuses, a job intermediate (relay) server is used as an example of a server apparatus or system, and a tablet device and a smart phone device are used as examples of operation apparatuses such as terminal devices.

FIG. 1 is a diagram illustrating a network environment of a job processing system of one embodiment. In the network environment 100A illustrated in FIG. 1, a plurality of Local Area Networks (LANs) 120 and 130 are connected to internet 102 via a router 104. A job intermediate server 110A that functions as a server apparatus in this embodiment is connected to the internet 102 and can be accessed from global networks such as the internet 102.

Examples of the LANs 120 and 130 include an intranet in a public office, a corporation, or a university, or a home network. In the network environment 100A shown in FIG. 1, LANs 120 and 130 are connected to the internet 102 while restricting access via a firewall. That is, although nodes on the LANs 120 and 130 can access the internet 102, access from global networks to the nodes on the LANs 120 and 130 is restricted.

Areas 150 surrounded by broken lines in FIG. 1 are in the same locations. In the LAN 120 in the first location 150A in FIG. 1, a notebook personal computer (PC) 122 and a laser printer 124 are connected to the LAN 120. In the LAN 130 in the second location 150B in FIG. 1, a desktop PC 132, a MFP 134, and a projector 136 are connected to the LAN 130. An access point 138 is also connected to the LAN 130 and provides wireless communications in IEEE 802.11a/b/g/n, etc., to wireless communication devices in the location 150B.

The laser printer 124, the MFP 134, and the projector 136 are electronic devices that provide specific functions to terminal devices connected to the network and process jobs requested by the terminal devices. The laser printer 124 is an image forming apparatus that provides a printing capabilities, processes requested printing jobs, and executes printing. The MFP 134 is an image forming apparatus capable of providing various image processing capabilities such as copier, scanner, printer, and/or facsimile. In this example, the MFP 134 is assumed to process a printing job and a scanning job. The projector 136 is an image displaying apparatus having the projecting capability and processes a projecting job requested by the terminal devices. Other examples of electronic devices include various devices such as a scanner, a facsimile, a photo frame, a digital camera, and a digital video camera.

In the network environment 100A in FIG. 1, the PCs 122 and 132, the tablet device 126, and the smart phone device 140 can be terminal devices that request the electronic devices 124, 134, and 136 to execute jobs. The PC 122 is connected to the LAN 120 in the location 150A, and the PC 132 is connected to the LAN 130 in the location 150B. DHCP servers in the LANs 120 and 130 allocate IP address to the PCs 122 and 132. Therefore, the PCs 122 and 132 can end-to-end communicate directly with electronic devices in the same network using TCP/IP protocol stack.

In some cases, wireless communication devices (the tablet device 126 and the smart phone device 140) in the location 150 can connect to the LANs 120 and 130 using the access point 138 and VPN etc. However, Service Set IDentifier (SSID) and Wired Equivalent Privacy (WEP) keys and VPN connection need to be set in advance for wireless communications devices 126 and 140 to join the LANs 120 and 130 using the access point 138 and VPN. Alternatively, some organizations have a strict network operating policy and manage SSIDs, passwords, and VPN connection settings with higher security standards. In those cases, accessing the LANs 120 and 130 inside the organization may be restricted.

In the example case shown in FIG. 1, the wireless communication devices 126 and 140 are not connected to the LANs 120 and 130 but are connected to the internet via mobile communications networks such as 3G/3.9G/4G and wireless communications networks such as Worldwide Interoperability for Microwave Access (WIMAX) using mobile data communication. Therefore, in the example case shown in FIG. 1, the wireless communication devices 126 and 140 cannot establish connection directly with electronic devices 124, 134, and 136.

Meanwhile, along with popularization and advance of tablet devices and smart phone devices recently, it is desirable for these devices to be able to utilize electronic devices in the intranet. Therefore, the job intermediate server 110 intermediates, that is, relays job requests to the electronic devices 124, 134, and 136 from the wireless communication devices 126 and 140 that cannot establish direct connection with the electronic devices 124, 134, and 136.

In this embodiment, the job intermediate server 110 is implemented as a Web server. The electronic devices 124, 134, and 136 and wireless communication devices 126 and 140 implement a Web client function. In addition, the job intermediate server 110 executes transactions with the electronic devices 124, 134, and 136 and wireless communication devices 126 and 140 using HTTP protocol. The electronic devices 124, 134, and 136 and wireless communication devices 126 and 140 are each capable of sending an HTTP request to the job intermediate server 110 and receiving an HTTP response from the job intermediate server 110. The job intermediate server 110 transmits jobs from terminals to electronic devices that cannot communicate with terminals directly and cannot receive communication initiated by nodes in external networks via HTTP transaction described above. In this embodiment in which the job intermediate server 110 is implemented as the Web server, electronic devices only need to include the Web client function, and that makes the implementation easy.

In addition, in the network environment 100A shown in FIG. 1, the job intermediate server 110A is open to the outside and receives access from the internet 102. Contrarily, in some cases, it is not desirable for the job intermediate server 110 to be open to the outside due to an organization's policy. In such case, a network environment 100B may be preferred as shown in FIG. 2.

Figure 2:
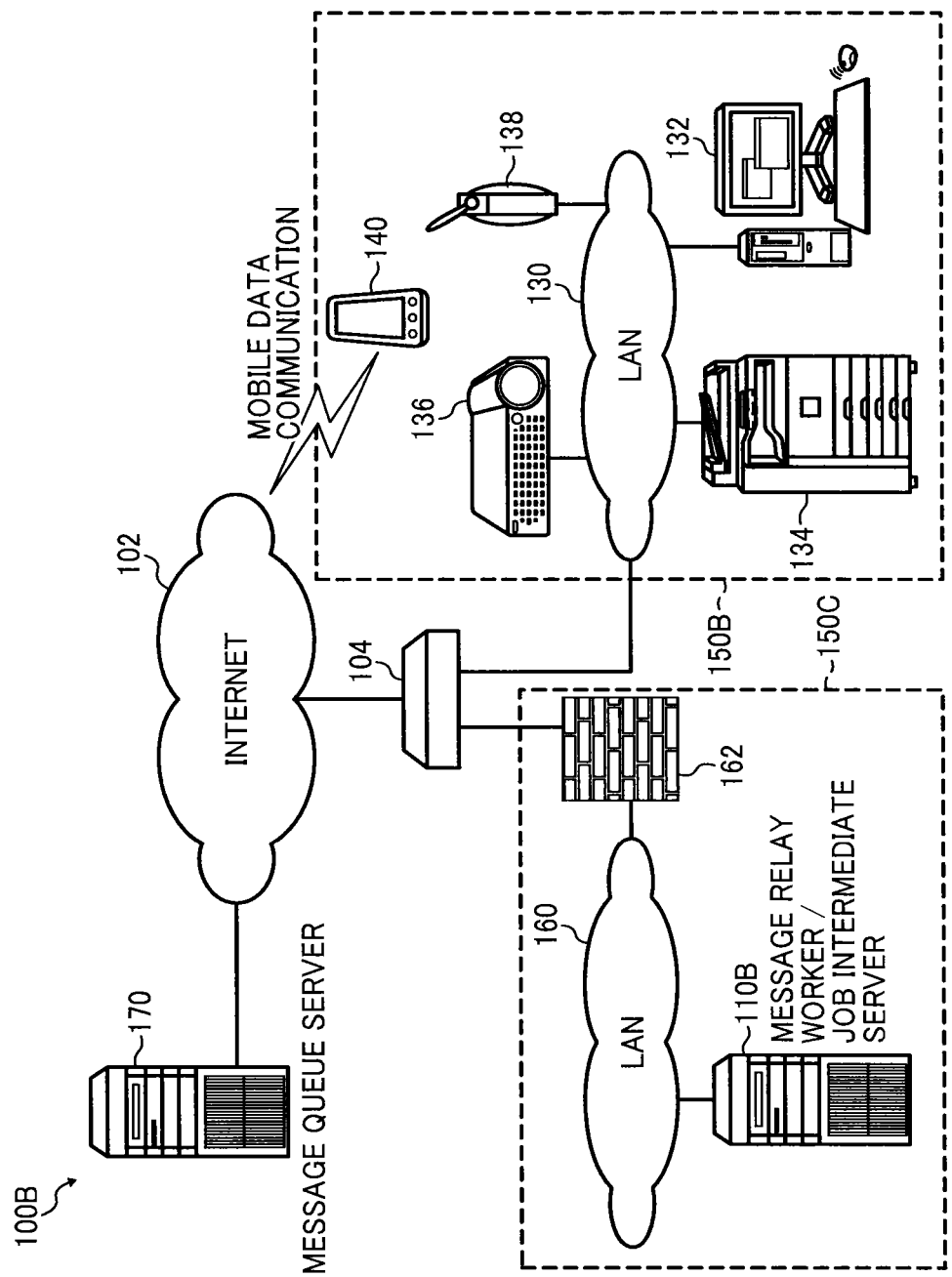
FIG. 2 is a schematic diagram illustrating a network environment of a job processing system as an embodiment of the present invention.

In network environment 100B shown in FIG. 2, a job intermediate server 110B is connected to a LAN 160 in a location 150C, such that access to the job intermediate server 110B from the internet 102 are blocked by a firewall 162. Meanwhile, a message queue server 170 that accepts requests from terminal devices and electronic devices and adds those requests to a queue is provided on the internet 102, and a message relay worker is provided on the LAN 160. The message relay worker is a server that transmits the requests added to the queue in the message queue server 170 to nodes in the LAN 160. The job intermediate server 110B can serve as the message relay worker as shown in FIG. 2. Otherwise, another server can serve as the message relay worker.

In the both network environment 110A in FIGS. 1 and 110B in FIG. 2, establishing communication from the electronic devices 124, 134, and 136 and wireless communication devices 126 and 140 to the job intermediate server 110B can be assured.

Figure 3:
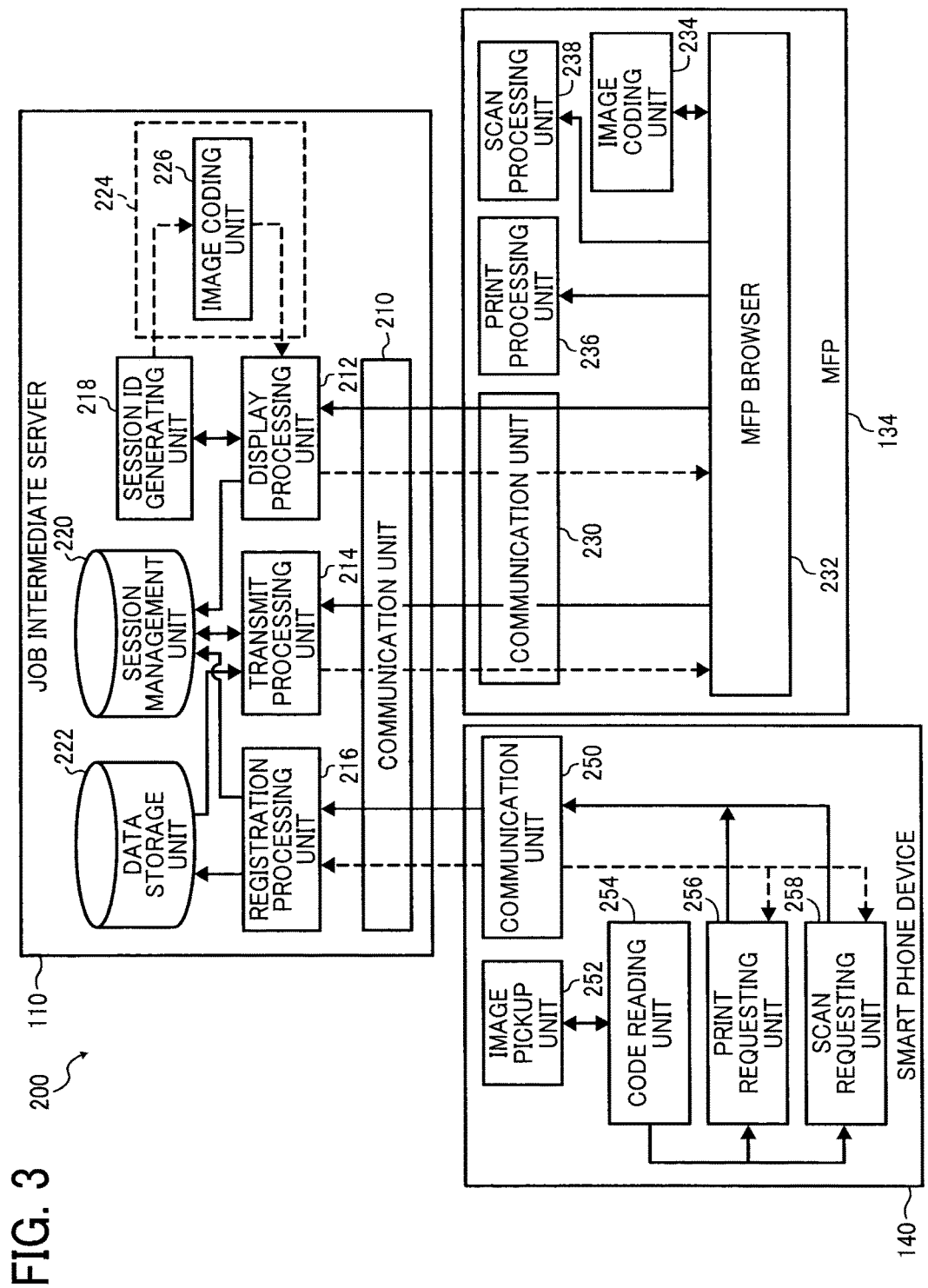
FIG. 3 is a schematic diagram illustrating functional blocks implemented in the job processing system of FIG. 1 or 2.

The job intermediating capability of the job intermediate server in the job processing system will be described in detail below with reference to FIGS. 3 to 16. FIG. 3 is a diagram illustrating functional blocks implemented in a job processing system 200 of the embodiment. The functional blocks shown in FIG. 3 include functional blocks implemented in the job intermediate server 110, functional blocks implemented in terminal devices such as the smart phone device 140, and functional blocks implemented in electronic devices such as the MFP 134.

The job intermediate server 110 includes a communication unit 210, a display processing unit 212, a transmit processing unit 214, a registration processing unit 216, a session ID generating unit 218, a session management unit 220, and a data storage unit 222. The MFP 134 includes a communication unit 230, a MFP browser 232, an image coding unit 234, a print processing unit 236, and a scan processing unit 238. The terminal device 140 includes a communication unit 250, an image capturing (pickup) unit 252, a code reading unit 254, a print requesting unit 256, and a scan requesting unit 258.

The communication units 210, 230, and 250 are each capable of controlling a network interface device included in the job intermediate server 110, the MFP 134, and the terminal device 140, respectively, to manage data communication with external nodes. The display processing unit 212, the registration processing unit 216, and the transmit processing unit 214 each receives requests from external nodes via the communication unit 210, executes processes in response to the requests, and returns processing results as responses via the communication unit 210.

Figure 4A:
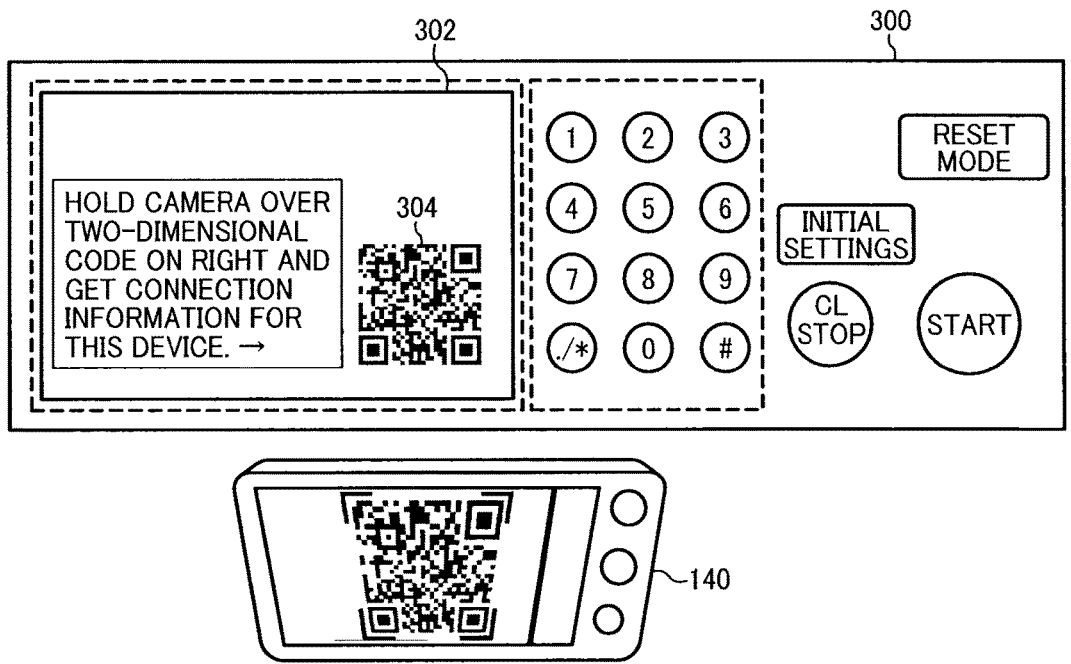
FIGS. 4A and 4B are illustration for explaining example operations of requesting to process a job issued from a terminal to an electronic device of the job processing system of FIG. 3.

FIG. 4A is a diagram illustrating operations to request a job from the terminal device 140 to the MFP 134. In this embodiment, the MFP 134 displays a code image 304, which is generated by encoding connecting information and allows a user to use the MFP 134, on a display 302 of a control panel 300 of the MFP 134. The MFP 134 sends a request to a specific address of the job intermediate server 110 using the MFP browser 232 to request for a screen ("a code image displaying screen"), in order to display the code image. The display processing unit 212 of the job intermediate server 110 generates screen data that defines a code image displaying screen in response to the request for the code image displaying screen. More specifically, the display processing unit 212 returns the screen data including the session ID as a response. The address may be specified by a Uniform Resource Identifier (URI), for example, such as a Uniform Resource Locator (URL) and a Uniform Resource Name (URN). The screen data may be written in HyperText Markup Language (HTML) format, e.g.

After acquiring the screen data, the MFP browser 232 in the MFP 134 calls the image coding unit 234 and sends the session ID included in the screen data to the image coding unit 234. The image coding unit 234 encodes connecting information that includes the session ID into a code image, in any desired format, such as in one-dimensional code, two-dimensional code, composite symbol that combines one-dimensional code and two-dimensional code, or other multi-dimensional code format. Two-dimensional code can be either matrix format or stack format, and QR code can be used as the two-dimensional code, for example. Subsequently, the MFP browser 232 displays the encoded code image 304 on the control panel 300.

In this example, connecting information such as the session ID described above, schema information, device type information that describes the capabilities of the electronic devices such as print function and scan function, and access information set beforehand to register a job accessing the job intermediate server 110 may be encoded. The schema information indicates that the code image includes the session ID and is targeted by the job intermediate function of the embodiment.

The session ID generator 218 in the job intermediate server 110 generates a session ID in this embodiment. The session ID generator 218 generates a session ID specific to the MFP 134 in response to calling from the display processing unit 212 and returns it to the display processing unit 212. It should be noted that a job source terminal device and a job destination electronic device join the session. The session may be defined as a series of communications that may be performed until processing of the job completes. Examples of session ID include Universally Unique Identifier (UUID) generated differently for each request, random value, and hash value.

The session management unit 220 manages the session ID allocated to the MFP 134. The session management unit 220 receives the session ID in response to calling from the display processing unit 212 and stores it in the session management table, adding expiration date. The session management unit 220 deletes the data or adds a delete flag to the data, for any record having the expired session ID. By setting an expiration date, problems relating to management, wiretapping, or misusing of serial numbers or device IDs for identifying electronic devices, may be reduced, thus improving the security. With registration of the session ID, the job intermediate server 110 can accept a request for registering jobs issued to the MFP 134.

It should be noted that, in the present embodiment, the job intermediate sever 110 generates the session ID and sends it to the MFP 134, and the MFP 134 encodes a code image using the sent session ID. Alternatively, the MFP 134 may generate the session ID and send it to the job intermediate server 110 to register it.

In this embodiment, the job intermediate server 110 can include the image coding unit 226 as shown surrounded by broken lines 224 in FIG. 3. In this case, the job intermediate server 110 acquires device type information from the MFP 134, encodes it using connecting information that includes the session ID, the schema information, the device type information, and the access information, and sends the encoded code image embedded in the screen data to the MFP 134. In such case, it is not necessary to install special software to implement the image coding unit 234 in the electronic device, and resource consumption in the electronic device can be reduced.

As shown in FIG. 4A, the terminal device 140 reads the code image 304 displayed on the MFP 134 using the image capturing unit 252 such as a camera, and requests the MFP 134 a job based on connecting information acquired from the code image. After starting the image capturing unit 252, the code reading unit 254 recognizes the code image in the shooting scope and extracts the connecting information encoded in the code image by decoding the captured code image.

The image capturing unit 252 may be implemented by an image scanning unit such as a camera, a barcode reader, and a scanner. This type of image scanning unit scans a code image using various methods such as manual scanning method, CCD scanning method, laser scanning method, image sensing method, and linear image sensing method.

After extracting the connecting information from the code image, the code reading unit 254 determines an application candidate to start from the extracted device type information and calls the requesting units 256 and 258 in response to a selection. The candidate application can be determined based on the device type information scanned from the electronic device along with the session ID. For example, print application and scan application are displayed selectable based on the device type information of the MFP 134 that includes the printing capability and the scanning capability. The user can choose the desired application from among the displayed options.

The print requesting unit 256 and the scan requesting unit 258 start in response to calling by the code reading unit 254 and accept a command to execute a job. The print requesting unit 256 sends a request to register a print job to the job intermediate server 110 via the communication unit 250 using address for job registration described in the connecting information as the access information in response to the command to execute printing that specifies a target document to be printed. The request to register includes information that indicates that the process request to be registered is a print job, the session ID, and print data to be printed.

Similarly, the scan requesting unit 258 sends a request to register a scan job to the job intermediate server 110 via the communication unit 250 using address for job registration in response to the command to execute scanning that specifies scan settings. The request to register includes information that indicates that the process request to be registered is a scan job, the session ID, and the scan settings data.

The registration processing unit 216 in the job intermediate server 110 registers the job included in the request to register in the session management unit 220 associating with the session ID included in the request to register in response to the request to register the job from the terminal device 140. This session ID was scanned by the terminal device 140 from the MFP 134 and sent by the terminal device 140. The registration processing unit 216 stores the print data sent with the print job or the scan settings data sent with the scan job in the data storage unit 222 and stores link information in the session management unit 220.

The registration processing unit 216 responds to the request and returns a result that indicates that the registration succeeded or the registration failed as a response via the communication unit 210. In case of the scan job, the registration processing unit 216 returns the response that indicates that the registration succeeded along with the address where scanned result is stored. It should be noted that the address where scanned result is stored could be either a storage area in the job intermediate server 110 or a storage area in a file server of the MFP 134 or other content management server.

As described above, the MFP browser 232 in the MFP 134 acquires the screen data from the job intermediate server 110 and displays the encoded code image 304 on the control panel 300. The screen data includes code description to send request to acquire a job along with the session ID to the job intermediate server 110 regularly or irregularly while the code image 304 embedded the session ID is displayed scannable by the terminal device 140. The code description is written in a browser interpretable language such as JavaScript. In this embodiment, the code image 304 can be displayed for a predetermined time to prevent continuing to display the connecting information after the operator leaves the MFP 134.

The transmit processing unit 214 in the job intermediate server 110 determines if a job that corresponds to the session ID included in the acquisition request is registered. If it is registered, the transmit processing unit 214 acquires the registered job associated with the session ID included in the acquisition request from the session management unit 220 and acquires corresponding entity data (print data or scan settings data) from the data storage unit 222. After acquiring the job and the entity data successfully, the transmit processing unit 214 returns a response that includes the job and the entity data via the communication unit 210 in response to the request to acquire the job sent from the MFP 134. Accordingly, the job requested by the request origin terminal device 140 is transferred to the request destination MFP 134.

Furthermore, the screen data includes code description interpretable by a browser to call request processing units 236 and 238 where the acquired job is processed in response to acquisition of the job as the response to the request to acquisition. If the acquired job is a print job, the print processing unit 236 in the MFP 134 is called and executes printing the print data sent with the print job.

If the acquired job is a scan job, the scan processing unit 238 is called, executes scanning in accordance with the scan settings data sent with the scan job, and stores scan data in a storage area specified by the address where scanning result is stored. Subsequently, the terminal device 140 can acquire the scan data.

It should be noted that entity data such as print data in a print job is included in a request to register a job from the terminal device 140 and included in a response to the acquisition request from the MFP 134. In another embodiment, the pointer address where entity data can be acquired or identification data that identifies entity data can be included in a response to a registration request and an acquisition request instead of including entity data itself.

If the pointer address is included, the MFP 134 acquires the entity data from the storage area in the job intermediate server 110 or other external server specified by the pointer address and executes so-called pull printing. Alternatively, the job intermediate server 110 acquires entity data from specified storage area, and the MFP receives the entity data sent from the job intermediate server 110. If identification data that identifies entity data such as a document ID that specifies document in the MFP 134, the entity data is acquired from the storage area in the MFP 134.

Figure 5:
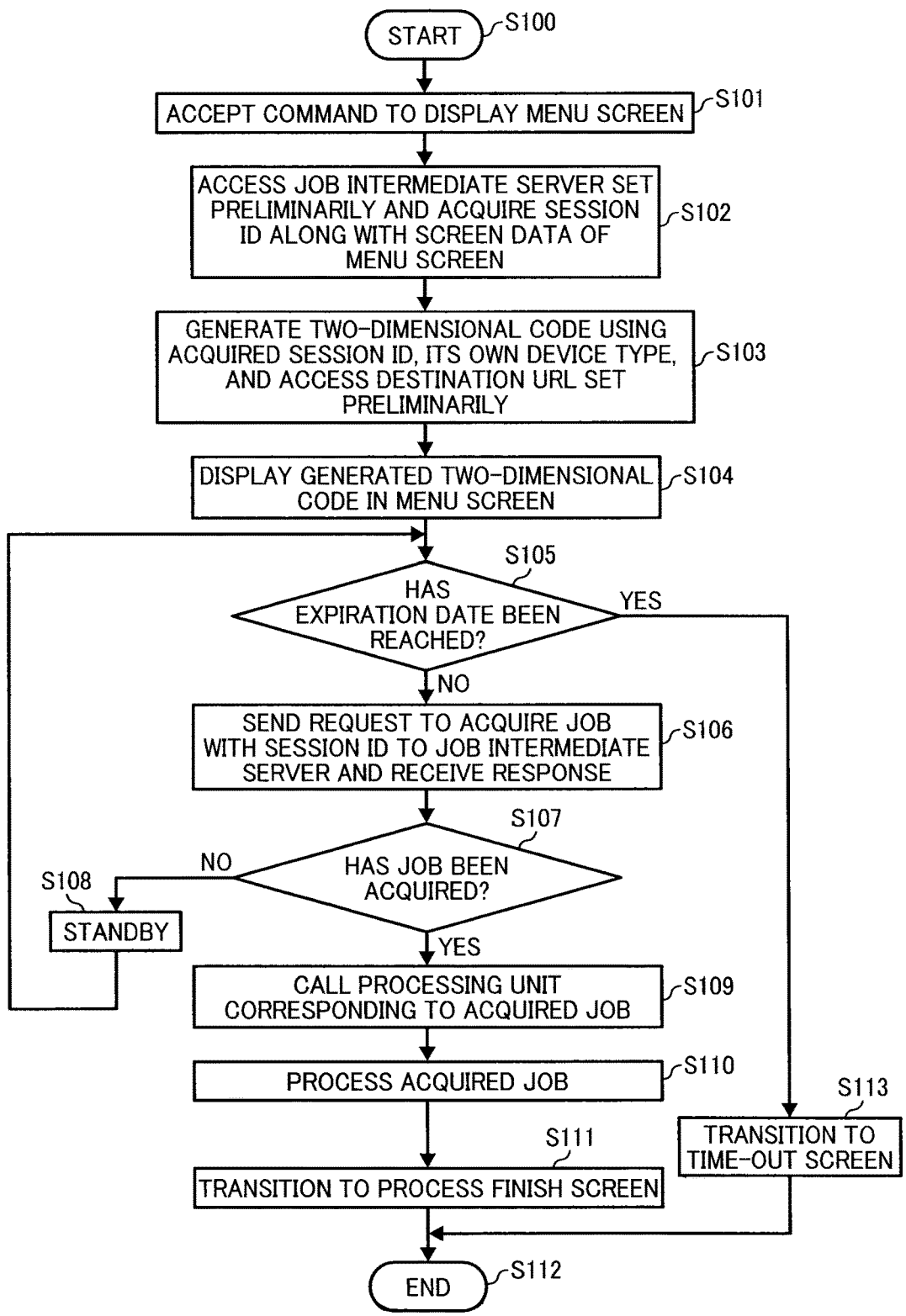
FIG. 5 is a flowchart illustrating operation of displaying a code image while waiting for a request to register a job, performed by an MFP, according to an embodiment of the present invention.

The operation of monitoring for registration of a job while displaying a code image on a display, performed by the electronic device, is described below with reference to FIG. 5 or FIG. 6. FIG. 5 is a flowchart illustrating operation of waiting for job registration according to an example embodiment, performed by the MFP 134, which starts from S100. The MFP 134 accepts a command to display a menu screen from an operator in S101. This menu screen corresponds to the code image displaying screen described above and is address is registered in the MFP browser 232 as a bookmark. In 5102, the MFP 134 accesses the job intermediate server 110 predefined in advance using the MFP browser 232, etc., and acquires the session ID allocated for the MFP 134 along with image data from the job intermediate server 110.

Figure 7A:
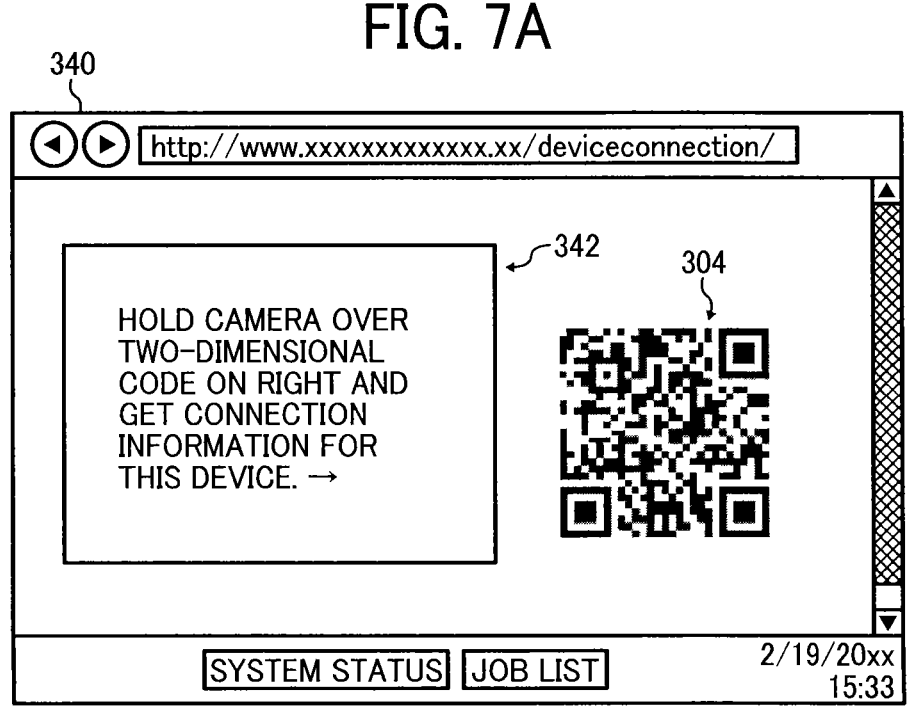
FIGS. 7A and 7B are example illustrations of a menu screen displayed in the MFP browser.

In S103, the MFP 134 generates a two-dimensional code encoded, e.g., from the acquired session ID, device type information that describes its own capabilities, and access information that includes a job registration address predefined in advance, using the image coding unit 234. In S104, the MFP 134 displays the generated two-dimensional code in the menu screen. FIG. 7A illustrates a menu screen displayed in the browser screen 340 of the MFP browser 232. As shown in FIG. 7A, the browser screen 340 includes the two-dimensional code 344 and a message 342 that prompts to scan the two-dimensional code 344.

Figure 7B:
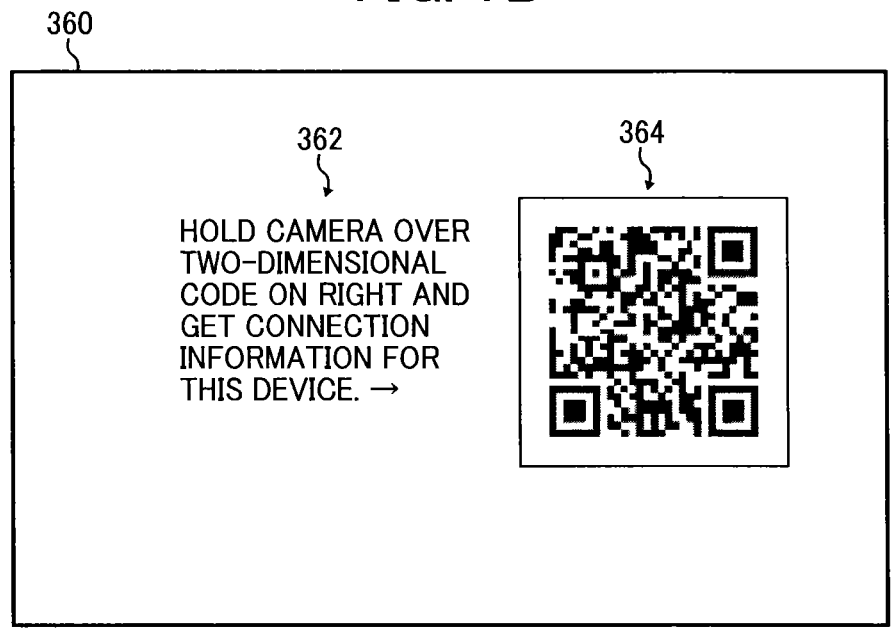

In this embodiment, the code image is displayed in the menu screen of the MFP browser 232. Alternatively, in other embodiments, the code image can be displayed in screens such as a screen saver screen 360 as shown in FIG. 7B, a start-up logo displaying screen, a system screen, or an about screen. The screen saver screen 360 in FIG. 7B includes a message display 362 and a two-dimensional code 364.

Successively, the MFP 134 waits for registering a job in the job intermediate server 110. In S105, the MFP 134 determines whether or not the expiration date of the session ID has already been reached by comparing the expiration date of the session ID received with the session ID with the current time. If it is determined that the expiration date has already passed (YES in S105), the process proceeds to S113. In S113, the MFP 134 switches the display to the time-out screen, and the operation ends in S112.

Alternatively, if it is determined that the expiration date has not been reached yet (NO in S105), the operation proceeds to S106. In 5106, the MFP 134 sends the job acquisition request with the session ID to the job intermediate server 110 and receives the corresponding response. In S107, the MFP 134 determines whether or not the job has already been acquired.

If it is determined that the job has not been acquired yet (NO in S107), the operation proceeds to S108. The MFP 134 waits for a predefined period of time in S108, looping to S105 and regularly polling request acquisition. Alternatively, if it is determined that the job has been acquired with response that includes the job (YES in S107), the regularly proceeds to S109.

In S109, the MFP 134 calls the request processing units 236 and 238 that correspond to the acquired job. If a print job was acquired, the print processing unit 236 is called, and if a scan job was acquired, the scan processing unit 238 is called. In S110, the MFP 134 instructs the corresponding request processing units 236 and 238 to execute the job. In case of a print job, the print processing unit 236 executes printing in response to the print data. In case of a scan job, the scan processing unit 238 executes scanning in response to the scan settings data and stores the acquired scan data in specified storing destination. After the job processing ends, the MFP 134 switches the display to a process completion screen that indicates the request job has ended in S111, and the regularly ends in S112.

Figure 6:
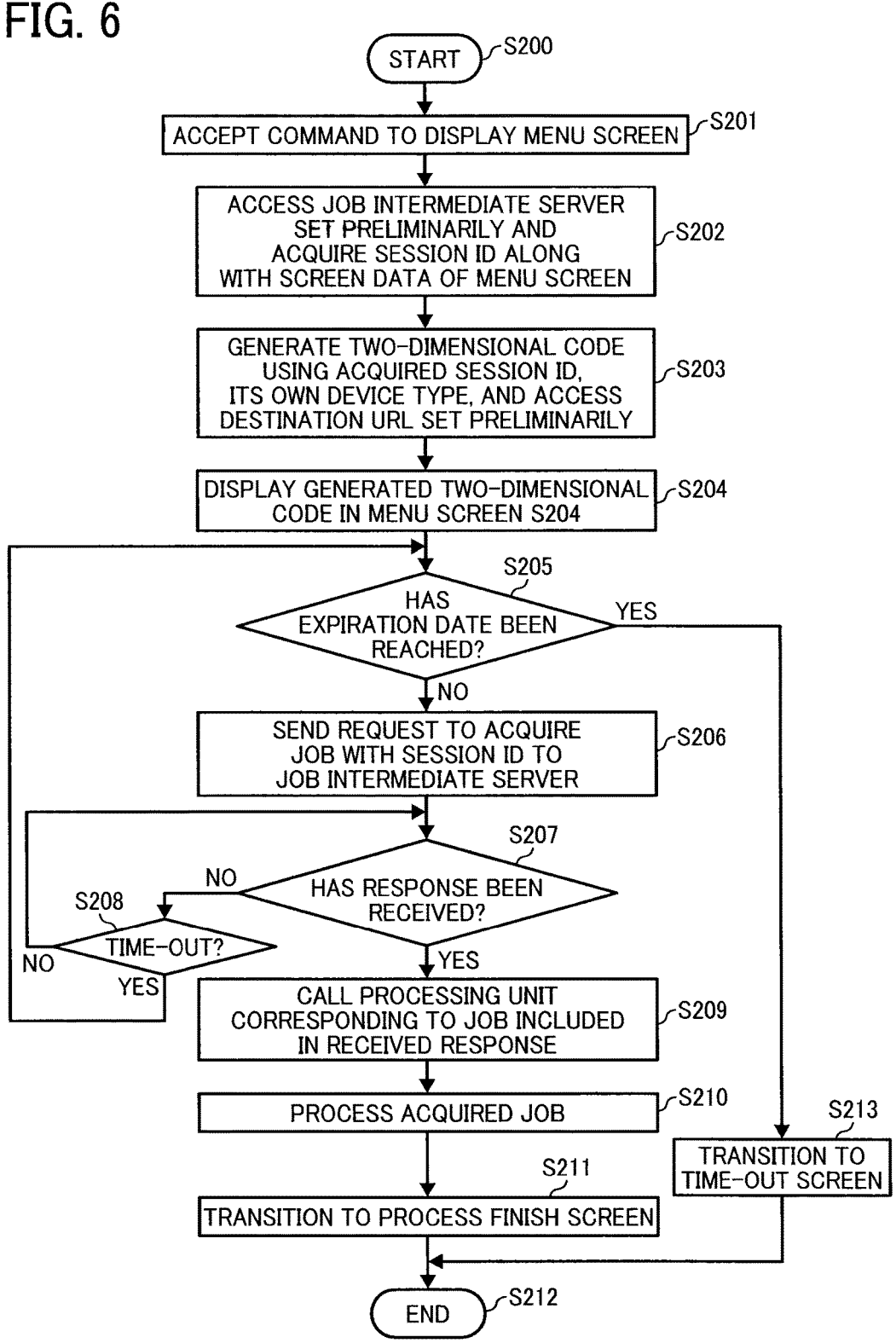
FIG. 6 is a flowchart illustrating operation of displaying a code image while waiting for a request to register a job, performed by an MFP, according to another embodiment of the present invention.

FIG. 6 is a flowchart illustrating operation of waiting for job registration according to another example embodiment, performed by the MFP 134, which starts from S200. It should be noted that the process from S201 to S204 is the same as the process from S101 to S104 in FIG. 5, so those descriptions are omitted. After S204, the MFP 134 keeps waiting for request for registering a job in the job intermediate server 110 in a substantially similar manner as described above referring to FIG. 5. In S205, the MFP 134 determines whether or not the expiration date of the session ID has been reached. If it is determined that the expiration date has already been reached (YES in S205), the operation proceeds to S213. The MFP 134 switches the display to the time-out screen in S213, and the operation ends in S212.

Alternatively, if it is determined that the expiration date has not been reached (NO in S205), the operation proceeds to S206. The MFP 134 sends the acquisition request with the session ID to the job intermediate server 110 in S206. After receiving the acquisition request, the job intermediate server 110 waits for corresponding response temporarily and waits for registering a job associated with the session ID. After the job associated with the session ID is registered, the job intermediate server 110 stops waiting and returns a response to the acquisition request.

The MFP 134 determines whether or not it has received the response. If it is determined that the MFP 134 has not received the response yet (NO in S207), the operation proceeds to S208. The MFP 134 determines whether or not predefined time-out period has elapsed in S208. If it is determined that the time-out period has not elapsed yet (NO in S208), the elapsed returns to S207. Alternatively, if it is determined that the time-out period has already elapsed (YES in S208), the process proceeds to S205, and another acquisition request may be sent.

Alternatively, if it is determined that the MFP 134 has already received the response (YES in S207), the operation proceeds to S209. In 5209, the MFP 134 calls the request processing units 236 and 238 that correspond to the processing request included in the received response. The MFP 134 has the corresponding request processing units 236 and 238 process the job. The MFP 134 switches the display to the process completion screen in S211, and the operation ends in S212. In case of the process flow shown in FIG. 6, a data traffic due to inquiry can be reduced compared to the example case of FIG. 5, which regularly executes polling.

Figure 8:
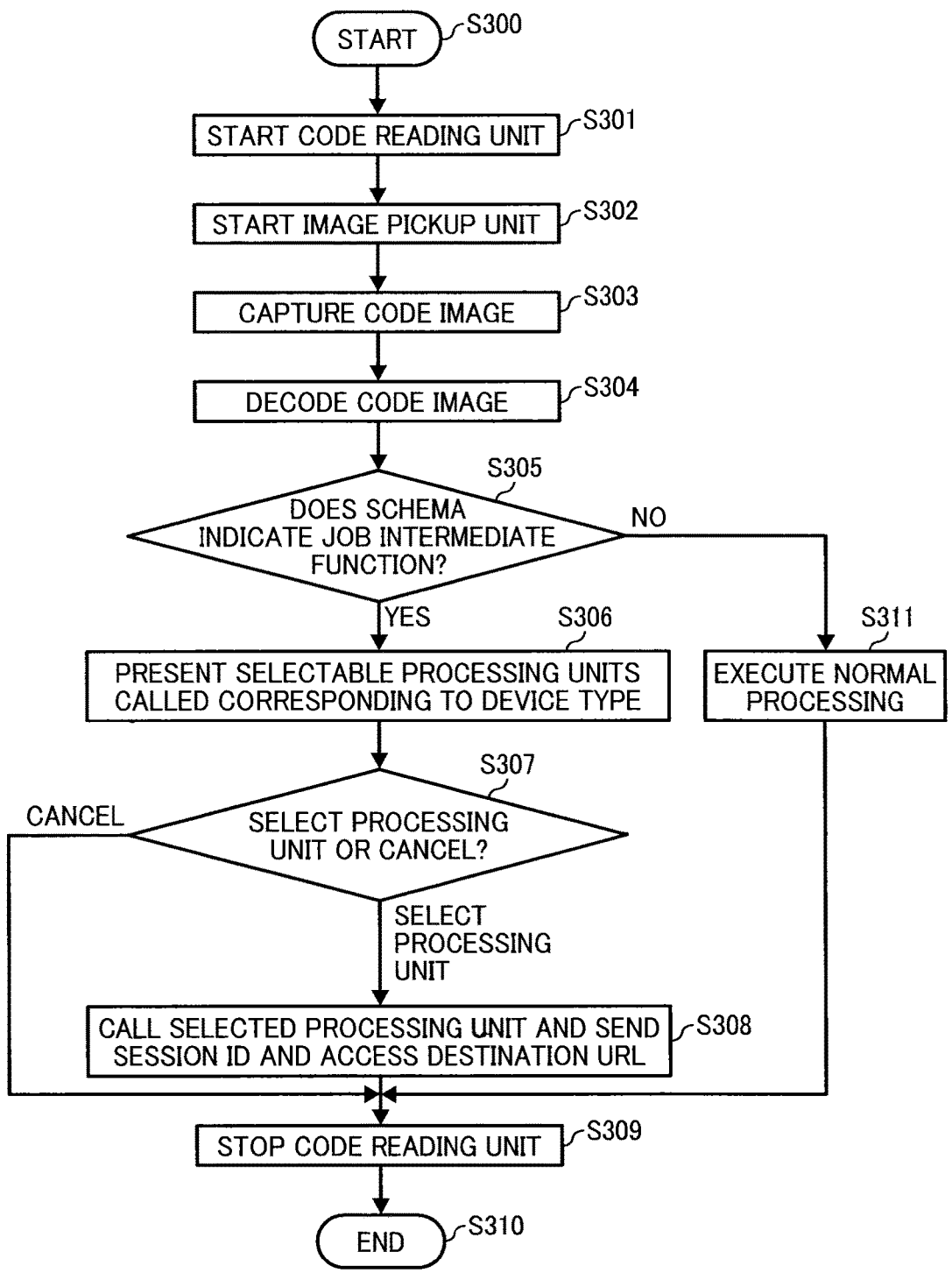
FIG. 8 is a flowchart illustrating operation of requesting registration of a job, performed by that the terminal device, according to an example embodiment of the present invention.

The process of the terminal device to register a job, by scanning the code image displayed on the display of the electronic device, is described below with reference to FIG. 8. FIG. 8 is a flowchart illustrating operation of requesting for registration, performed by the terminal device 140, which starts from S300. The terminal device 140 executes the code reading unit 254 in response to the command from the user in S301.

The terminal device 140 executes the image capturing unit 252 in S302 and instructs the image capturing unit 252 to capture an image of the two-dimension code displayed on the control panel of the MFP 134 in S303. The terminal device 140 instructs the code reading unit 254 to decode the captured two-dimensional code in S304. The terminal device 140, using the code reading unit 254, determines whether it is encoded in a format that corresponds to the job intermediate function in this embodiment or if it is encoded in a format that describes a standard URL, based on schema information included in the connecting information in S305.

If it is determined that the schema information is described in a format that corresponds to the job intermediate function (YES in S305), the operation proceeds to S306. In S306, the terminal device 140 determines candidate processing units to be called from the device type information included in the connecting information and displays them selectably on the display included in or accessible by the terminal device 140. In S307, the terminal device 140 determines whether the user has selected a processing unit among the candidates or it has been canceled by the user.

If it is determined that the user has selected a processing unit in S307, the operation proceeds to S308. The terminal device 140 calls the selected processing unit and sends the session ID and the access destination address to the processing unit. Subsequently, the called processing unit accesses the job intermediate server 110 specified by the access destination address and requests to register a job with the session ID. The terminal device 140 stops operation of the code reading unit 254, and the operation ends in S310.

Alternatively, if it is canceled in S307, the operation proceeds to S309. In this case, the code reading unit 254 stops operation in S309, and the operation ends in S310. Alternatively, if it is determined that the schema information is written in standard format (NO in S305), the operation proceeds to S311. The terminal device 140 performs the process based on the two-dimensional code having the standard format in S311. The code reading unit 254 stops operation in S309, and the operation ends in S310. It should be noted that an example of the process at S311 includes recognizing symbols extracted from the two-dimensional code as a URL and call the browser.

Figure 9:
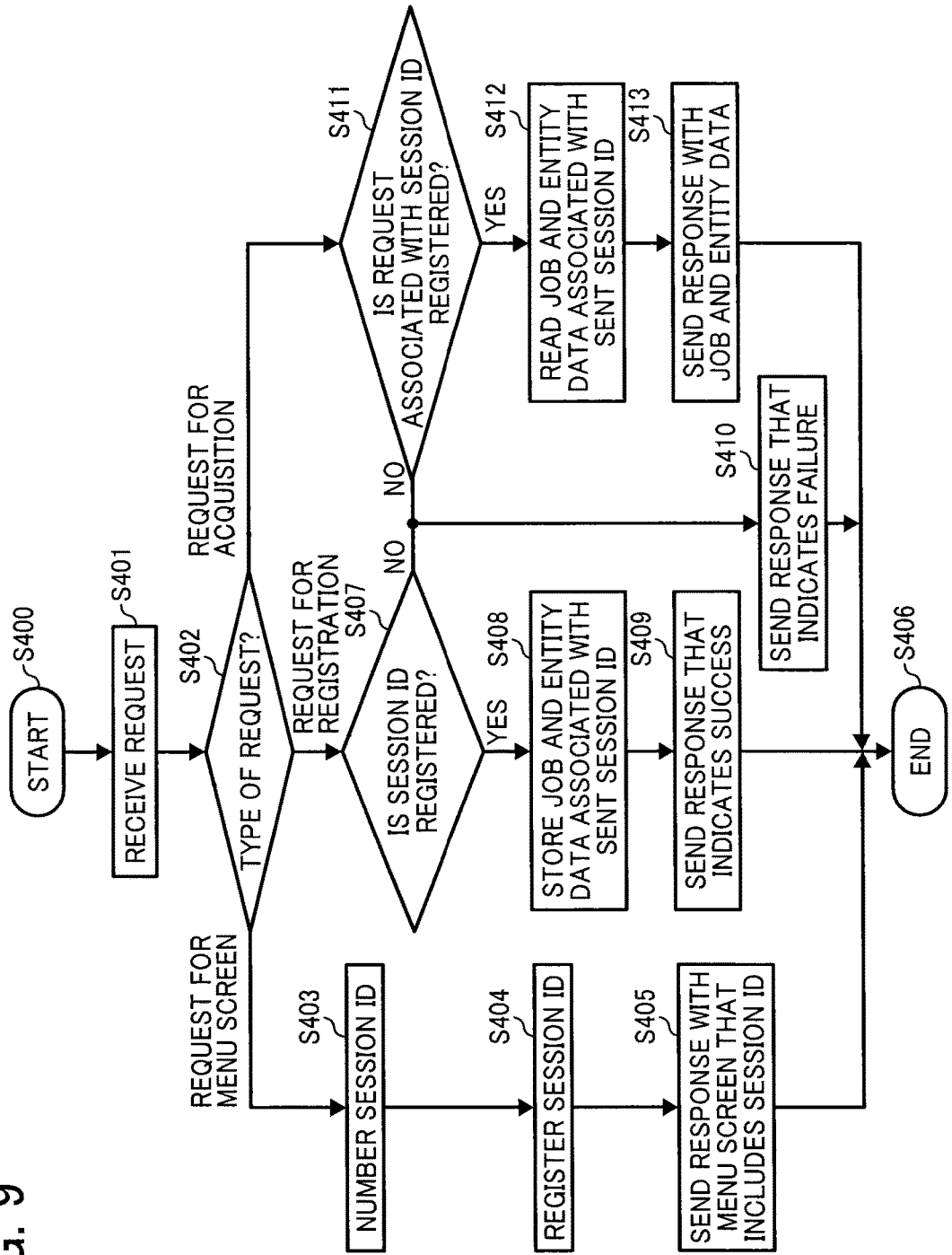
FIG. 9 is a flowchart illustrating operation of processing a request, performed by a job intermediate server, according to an example embodiment of the present invention.

The operation of the job intermediate server 110 to receive the request from the electronic device and the MFP and return a response is described below with reference to FIG. 9. FIG. 9 is a flowchart illustrating operation that the job intermediate server 110 executes, which starts from S400. The job intermediate server 110 receives a request from the electronic device or the MFP using the communication unit 210 in S401. The operation branches in S402 depending on the request type.

If the received request is a request for a menu screen in S402, the operation proceeds to S403. The job intermediate server 110 numbers a session ID using the session ID generating unit 218 in S403 and stores the session ID in the session management unit 220 in S404. FIG. 10 is a diagram illustrating a data structure of a session management table managed by the session management unit 220. As shown in FIG. 10, a record that includes a value is added to a session ID column 380a in a session management table 380 by newly generating the session ID. The job intermediate server 110 sends a response that includes the screen data that describes the menu screen with the session ID to the request origin (the MFP 134) using the communication unit 210 in S405, and the operation ends in S406.

If the received request is a request to register a job in S402, the operation proceeds to S407. The job intermediate server 110 determines whether or not the session ID included in the registration request is registered in the session management table 380 in S407. If the session ID is not registered or the expiration date of the session ID has already been reached, it is determined that the session ID is not registered. If it is determined that the session ID is not registered (NO in S407), the job intermediate server 110 sends a response that indicates failure to the request origin (the terminal device 140) in S410, and the operation ends in S406.

Alternatively, if it is determined that the session ID is registered (YES in S407), the operation proceeds to S408. The job intermediate server 110 inputs a predefined expiration date in column 380b of the record that stores the session ID included in the registration request, stores the job and the entity data in the data storage unit 222, and inputs link information to the job and the entity data in column 380c in S408. The job intermediate server 110 sends a response that indicates success of registration to the request origin (the terminal device 140), and the operation ends in S406.

If it is determined that the received request is a request to acquire a job, the operation proceeds to S411. The job intermediate server 110 determines whether or not the job associated with the session ID included in the acquisition request is registered in the session management table 380. If the job that corresponds to the session ID is not registered or expiration date of the session ID is reached, it is determined that the job is not registered. If it is determined that the job associated with the session ID is not registered (NO in S411), the job intermediate server 110 sends a response that indicates failure to the request origin (the MFP 134) in S410, and the operation ends in S406.

Alternatively, if it is determined that the job associated with the session ID is registered (YES in S411), the operation proceeds to S412. The job intermediate server 110 reads the record that includes the session ID included in the acquisition request from the session management table 380 and reads the job and the entity data from the data storage unit 222 based on the link information in the column 380c in S412. The job intermediate server 110 sends a response with the job and the entity data to the request origin (the MFP 134), and the operation ends in S406.

FIG. 11 is a sequence diagram illustrating execution of a print job by the job processing system 200. It should be noted that the MFP 134 has requested the job intermediate server 110 for the menu screen, and the code image is displayed on the control panel of the MFP 134 at the starting point in FIG. 11.

The MFP 134 sends a request to acquire a job with the session ID to the job intermediate server 110 in S500. The job has not been registered in association with the session ID yet at this point, so the job intermediate server 110 sends a response that indicates no registration to the MFP 134 in S501.

The terminal device 140 reads the code image displayed on the control panel of the MFP 134 and sends a request to register a print job to the job intermediate server 110 in response to a command to execute a print job from the user in S502. The registration request includes the session ID and the print data. The job intermediate server 110 registers the print job in the session management table 380 in response to the registration request in S503.

The MFP 134 sends the request to acquire the job with the session ID to the job intermediate server 110 again in S504. Since the job has already been registered associating with the session ID in S502 and S503 at this point, the job intermediate server 110 sends a response that indicates that registration exists to the MFP 134 in S505. The response that indicates that registration exists includes print data. The MFP 134 determines that the received job is a print job and executes printing along with the included print data in S506. As described above, the print job that the terminal device 140 requested the MFP 134 is executed.

Figure 12:
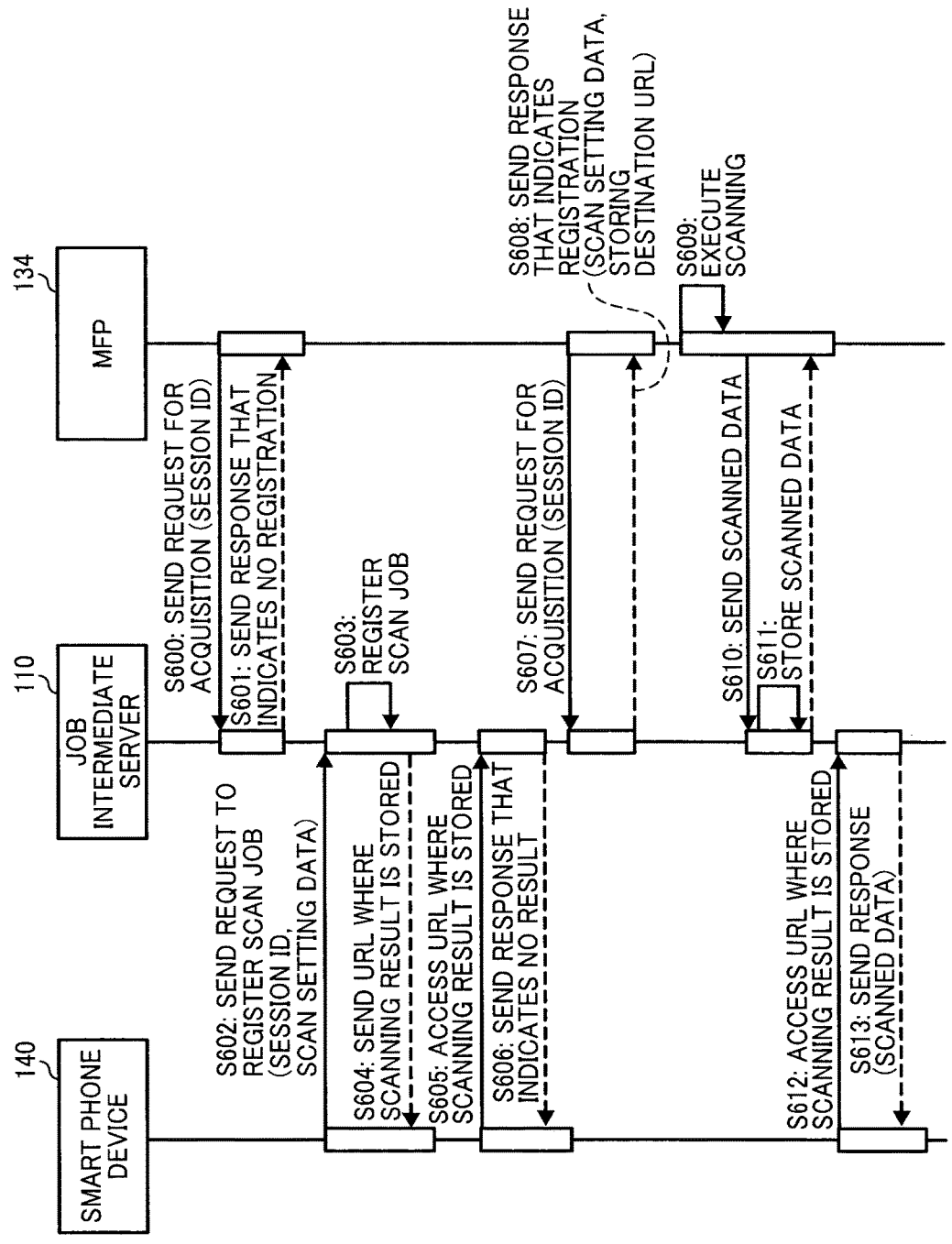
FIG. 12 is a data sequence diagram illustrating operation of executing a scan job as an embodiment.

FIG. 12 is a sequence diagram illustrating execution of a scan job by the job processing system 200. It should be noted that the MFP 134 has requested the job intermediate server 110 for the menu screen, and the code image is displayed on the control panel of the MFP 134 at the starting point in FIG. 12 just like as in FIG. 11. The MFP 134 sends a request to acquire a job with the session ID to the job intermediate server 110 in S600. The job has not been registered associating with the session ID yet at this point, so the job intermediate server 110 sends a response that indicates no registration to the MFP 134 in S601.

The terminal device 140 reads the code image displayed on the control panel of the MFP 134 and sends a request to register a scan job to the job intermediate server 110 in response to a command to execute a scan job from the user in S602. The registration request includes the session ID and the scan settings data. The job intermediate server 110 registers the scan job in the session management table 380 in response to the registration request in S603. The job intermediate server 110 generates scan results storing destination address and sends the response to the registration request including the scan results storing destination address in S604.

The terminal device 140 accesses the job intermediate server 110 specified by the scan results storing destination address and tries to acquire the scanning results in S605. Since the scanning process has not finished yet at this point, the job intermediate server 110 returns a response that indicates there is no result to the terminal device 140 in S606.

In S607, the MFP 134 sends the request to acquire a job with the session ID to the job intermediate server 110 again. Since the job has already been registered associated with the session ID in S602 and S603 at this point, the job intermediate server 110 sends a response that indicates the registration exists to the MFP 134 in S608. The scan settings data (including the scan result storing destination address) is added to the response that indicates the registration exists.

In S609, the MFP 134 determines that the received job is a scan job and executes scanning along with the added scan settings data. In S610, the MFP 134 sends the scanned data as the scanning result to the storing destination in the job intermediate server 110 specified by the scan result storing destination address. In S611, the job intermediate server 110 stores the received scan data in the predefined storing area.

In S612, the terminal device 140 tries to acquire the scanning result by accessing the job intermediate server 110 specified by the scan result storing destination address again. At this point, the scanning process has already ended in S609 to S611, and the scan data has been stored. Therefore, in S613, the job intermediate server 10 sends a response that includes the scan data to the terminal device 140. As described above, the scan job that the terminal device 140 request the MFP 134 to execute is executed in the job processing system 200 in this embodiment.

Figure 13:
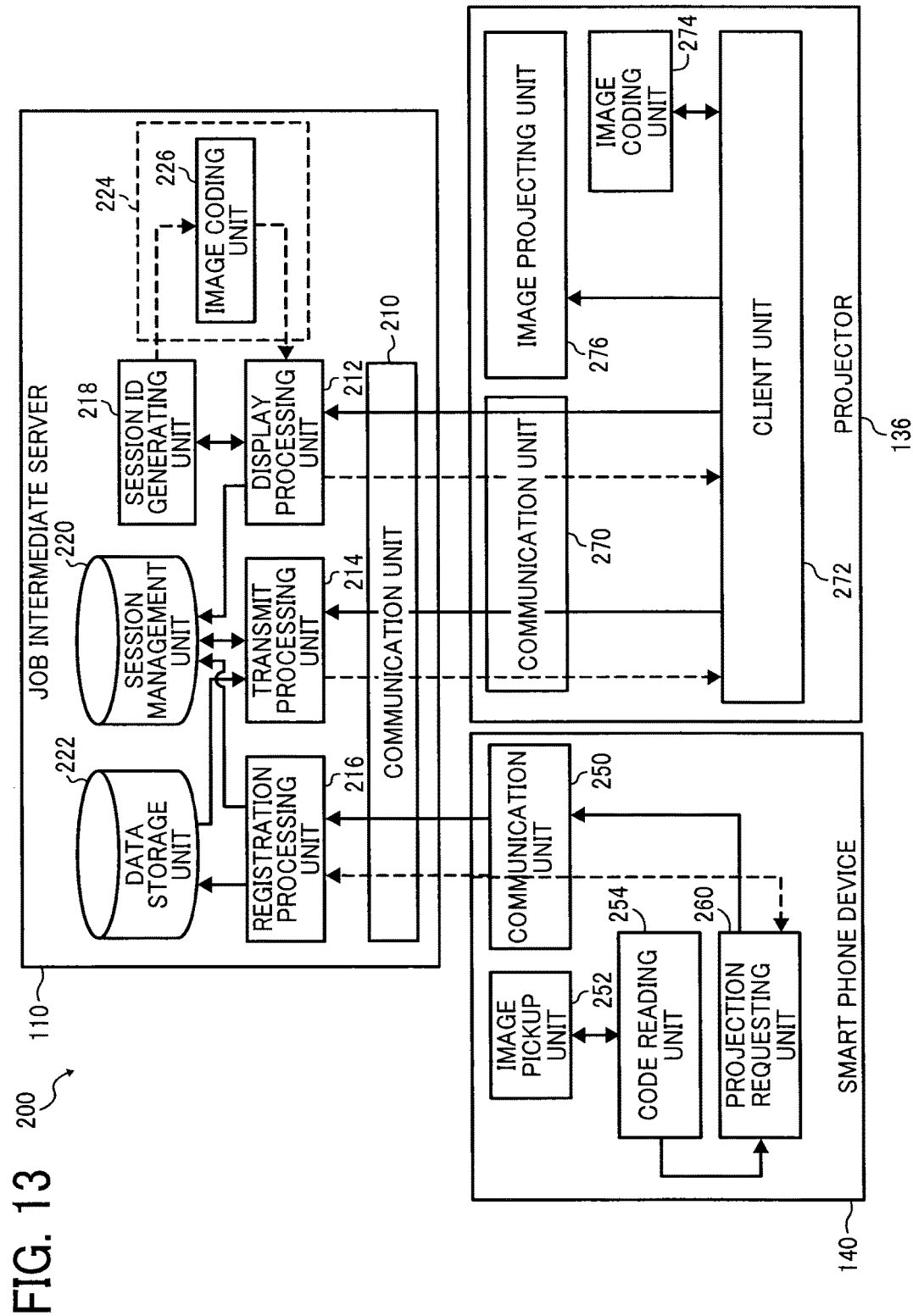
FIG. 13 is a schematic diagram illustrating other functional blocks of the job processing system of FIG. 2 or 3 as an embodiment.

A job intermediating capability of the job intermediate server in case the electronic device is the projector 136 in the job processing system in this embodiment is described below with reference to FIG. 13 and FIG. 14. FIG. 13 is a diagram illustrating other functional blocks implemented by the job processing system 200 in this embodiment. The functional blocks implemented in the job intermediate server 110, the terminal device 140, and the projector 136 are shown in FIG. 13

In the job intermediate server 110, the functional units from 220 to 222 are substantially the same as described above referring to FIG. 3. The functional blocks in the projector 136 include a communication unit 270 that controls a network interface unit included in the projector 136, a client unit 272, an image coding unit 274, and an image projection processing unit 276. The functional blocks in the terminal device 140 shown in FIG. 13 include a projection requesting unit 260, in addition to the print requesting unit 256 and scan requesting unit 258 that are described above referring to FIG. 3.

Figure 4B:
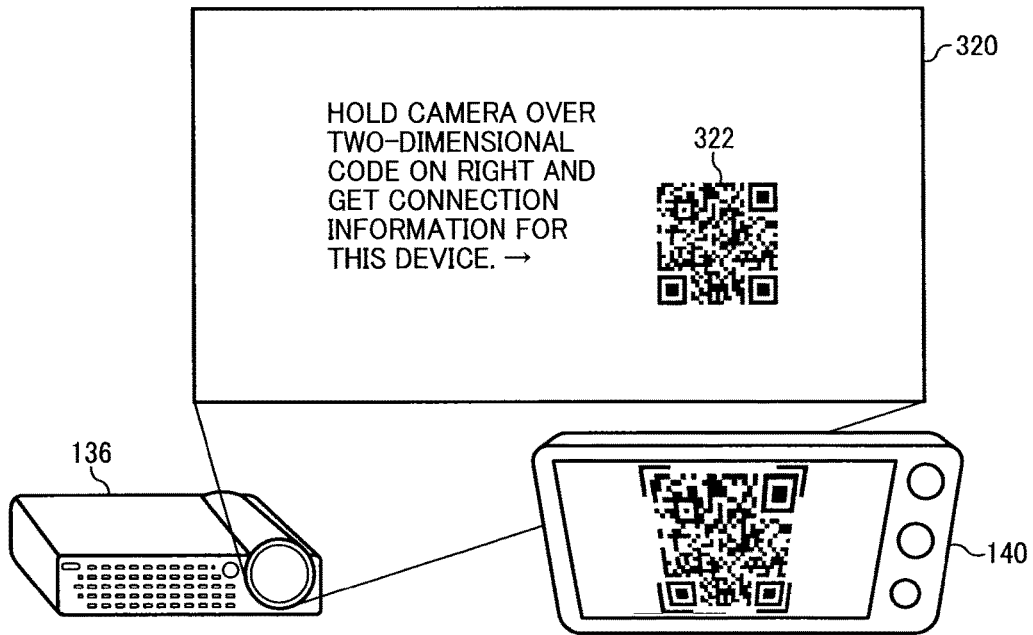

As shown in FIG. 4B, the terminal device 140 reads a code image 322 that the projector 136 projects on a screen 320 using an image capturing unit 252 such as a camera and requests the projector 136 to execute a job based on connecting information acquired from the code image. After extracting the connecting information from the code image, the code reading unit 254 calls requesting units 256, 258, and 260 depending on extracted device type information and user's choice or preference. Since device type that describes that the projector 136 has a function of projecting is included in the code image read from the projector 136, applications for operating the projector are presented selectably.

The projection requesting unit 260 starts up in response to calling from the code reading unit 254 and accepts a command to project specifying a presentation file to be projected. In response to the command, the projection requesting unit 260 sends a request to register a projecting job to the job intermediate server 110 using the address for registering a job in the connecting information. Information that indicates the request to be registered is a projecting job, the session ID that identifies the projector 136 as the request origin, and the projection data to be projected are included in the request to register. Examples of the projection data are a presentation file and any file projectable by the projector 136, such as a Portable Document File (PDF). The registration processing unit 216 registers the projecting job in the session management unit 220, stores the projection data sent with the projecting job in the data storage unit 222, and stores the link information in the session management unit 220.

The client unit 272 in the projector 136 acquires screen data from the job intermediate server 110 and projects a code image encoded by the image coding unit 274 on a screen. While projecting the code image in which the session ID is embedded readably by the terminal device 140, the projector 136 regularly or irregularly sends a request to acquire a job with the session ID to the job intermediate server 110 in a substantially similar manner as described above in the case of the MFP 134. In response to the request to acquire a job from the projector 136, the transmission processing unit 214 returns a response that includes a job registered in association with the session ID added to the acquisition request and corresponding projection data. Therefore, the job requested by the terminal device 140 as the request origin is transmitted to the projector 136 as the request destination.

In response to the projecting job was acquired as the response to the acquisition request, the client unit 272 calls an image projection processing unit 276 that processes the acquired projecting job. The image projection processing unit 276 projects the projection data sent with the projecting job.

Figure 14:
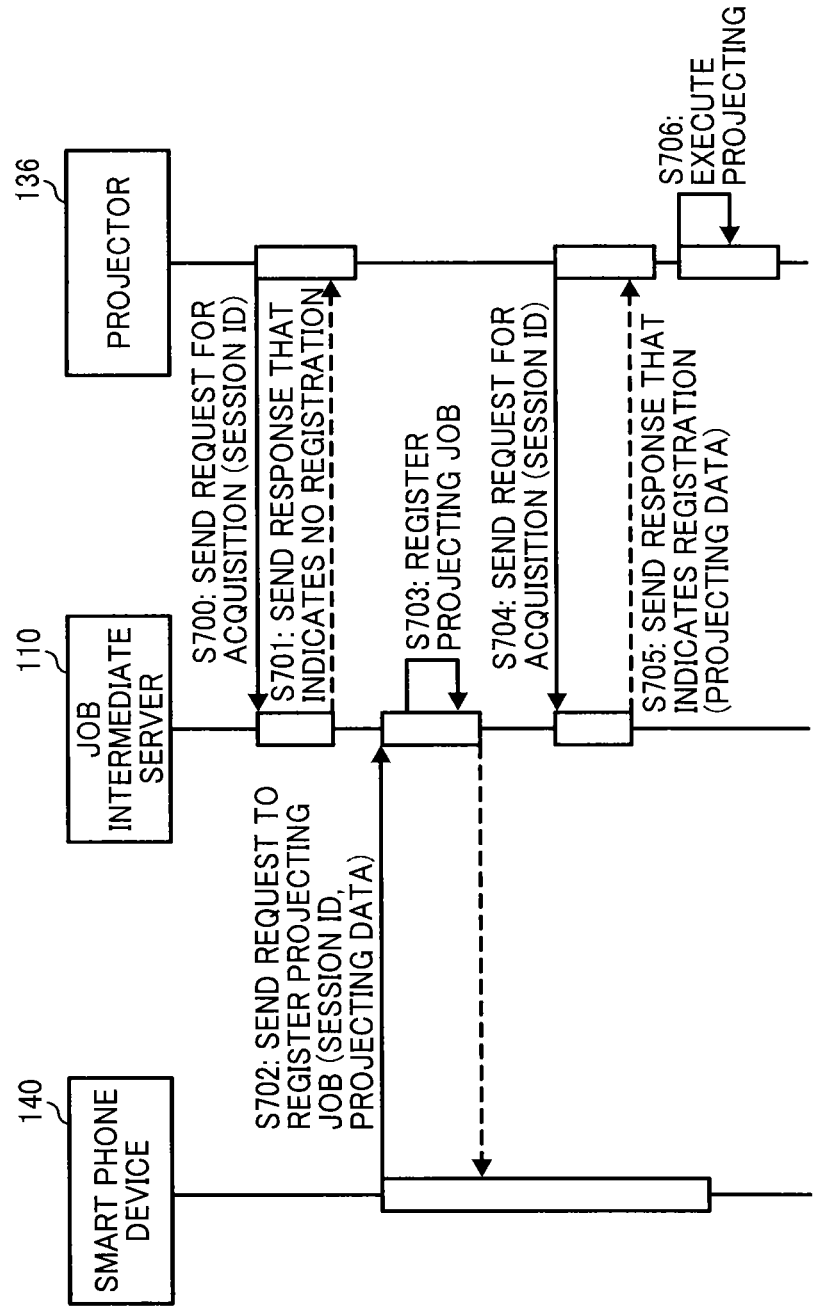
FIG. 14 is a data sequence diagram illustrating operation of executing a projection job as an embodiment.

FIG. 14 is a sequence diagram illustrating execution of the projecting job by the job processing system 200. It should be noted that the projector 136 has requested the job intermediate server 110 for the menu screen, and the projector 136 projects the code image on the screen at the same starting point in FIG. 14 as in FIG. 11.

The projector 136 sends a request to acquire a job with the session ID to the job intermediate server 110 in S700. The job has not been registered associating with the session ID yet at this point, so the job intermediate server 110 sends a response that indicates no registration to the projector 136 in S701.

The terminal device 140 reads the code image displayed on the screen by the projector 136 and sends a request to register a projecting job to the job intermediate server 110 in response to a command to execute a projecting job from the user in S702. The registration request includes the session ID and the projection data. The job intermediate server 110 registers the projecting job in the session management table 380 in response to the registration request in S703.

The projector 136 sends the request to acquire the job with the session ID to the job intermediate server 110 again in S704. The job intermediate server 110 sends a response that indicates that registration exists to the projector 136 in S705. The response that indicates that registration exists includes the projection data. The projector 136 determines that the received job is the projecting job and executes projecting along with the included projection data in S706. As described above, the projecting job that the terminal device 140 requested the projector 136 is executed.

Figure 15A:
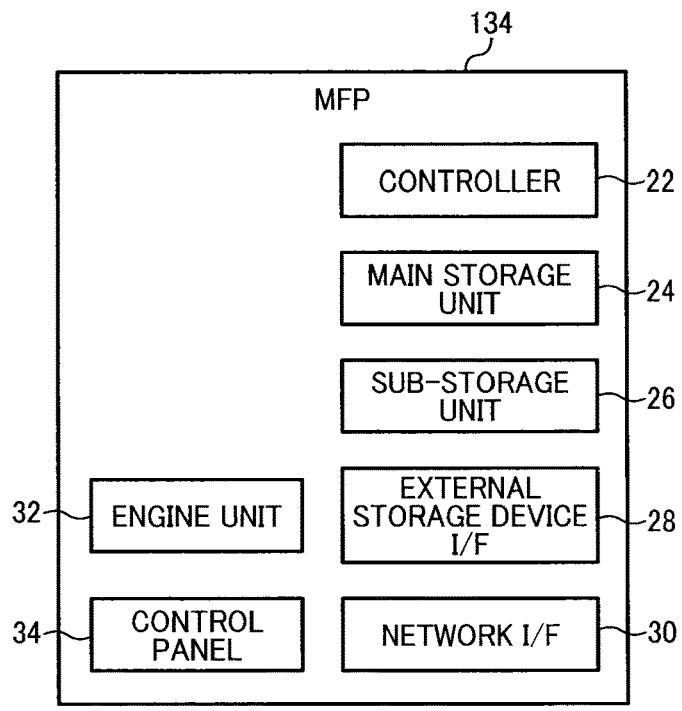
FIG. 15A is a schematic diagram illustrating a hardware configuration of the MFP in the job processing system of FIG. 2 or 3 as an embodiment of the present invention.
Figure 15B:
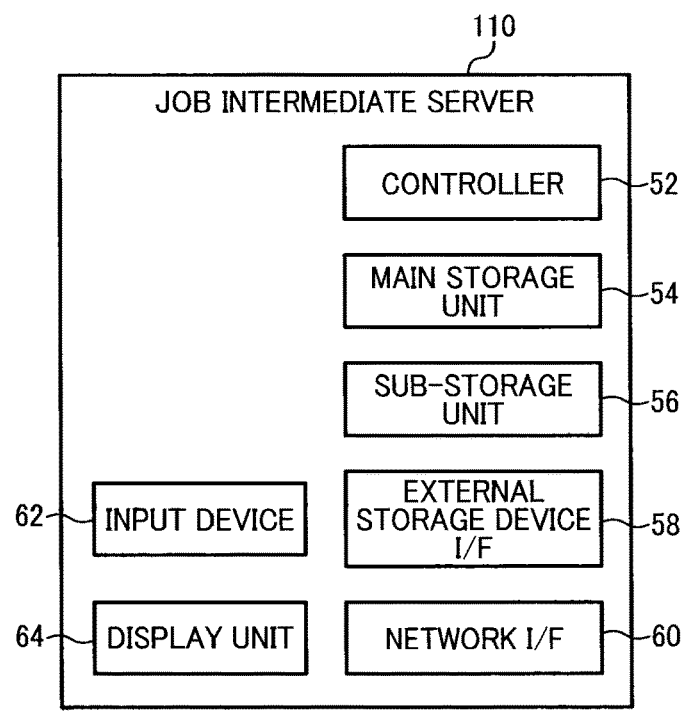
FIG. 15B is a schematic diagram illustrating a hardware configuration of the job intermediate server in the job processing system of FIG. 2 or 3 as an embodiment of the present invention.
Figure 16:
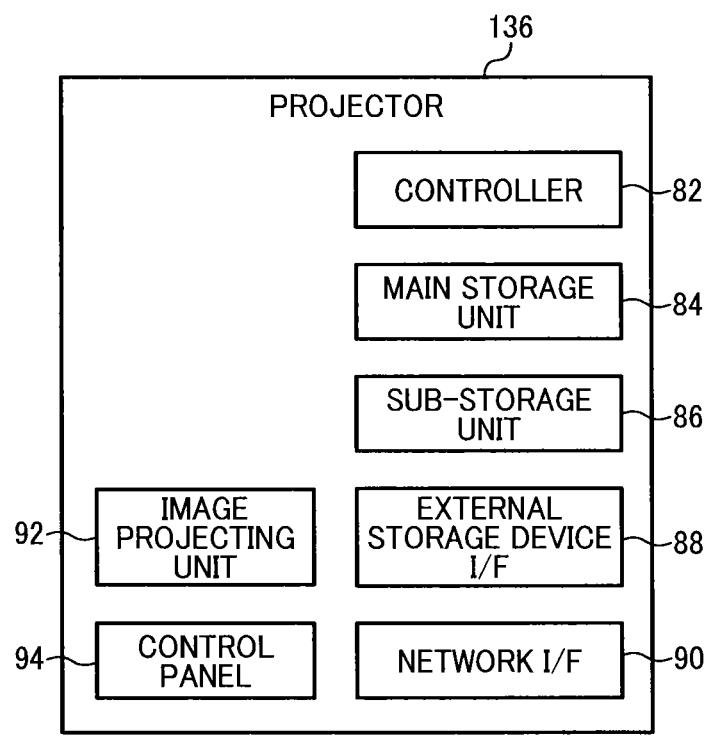
FIG. 16 is a schematic diagram illustrating a hardware configuration of a projector in the job processing system of FIG. 2 or 3 as an embodiment of the present invention.

Hardware configuration of the electronic devices 134 and 136 and the job intermediate server 110 in this embodiment is described below with reference to FIGS. 15A and 15B and FIG. 16. FIG. 15A is a schematic diagram illustrating a hardware configuration of the MFP. FIG. 15B is a schematic diagram illustrating a hardware configuration of the job intermediate server. FIG. 16 is a diagram illustrating a hardware configuration of the projector. The MFP 134 shown in FIG. 15A includes a controller 22 such as a Central Processing Unit (CPU), and a main storage unit 24 such as Random Access Memory (RAM). Furthermore, the MFP 134 includes a sub-storage unit 26 such as a Hard Disk Drive (HDD) and a Solid State Drive (SSD), an external storage device I/F 28, a network I/F such as a Network Interface Card (MC), an engine unit 32, and a control panel 34.

The sub-storage unit 26 stores image data, document data, programs, font data, and form data etc. Also, the sub-storage unit 26 stores an OS to control the MFP 134, control programs to implement the functional units described above, various system information, and various setting information. The external storage device I/F 28 is an interface unit to connect with external storage media such as a USB flash memory, a smart media, a SD memory card. The network I/F 30 is an interface unit to connect the MFP 134 to a network.

The engine unit 32 includes a plotter engine such as electrophotographic and a scanner engine that uses method such as Charge Coupled Device (CCD) and Contact Image Sensor (CIS). The control panel 34 includes a displaying unit such as a LCD display and input devices such as a hardware key and a touch panel accordingly. The control panel 34 is an output device to display a code image and provides a user interface to accept various command inputs from an operator on the MFP 134. The MFP 134 implements functional units and processes described above under the control of the controller 22 by reading various programs from the sub-storage unit 26 and expanding them into a working area that the main storage unit 24 provides.

The job intermediate server 110 is configured as a general-purpose computer such as a desktop personal computer, a workstation, a blade server, and a rack mount server. The job intermediate server 110 shown in FIG. 15B includes a controller 52 that includes a single core CPU or a multicore CPU, a main storage unit 54 such as RAM, a sub-storage unit 56 such as a HDD and a SSD, an external storage device I/F 58, and a network I/F 60.

Also, the job intermediate server 110 can include an input device 62 and a display unit 64 so that they provide a user interface to accept various command inputs from an operator on the job intermediate server 110. The input device 62 includes input devices such as a mouse, a keyboard, and a touch panel. The job intermediate server 110 implements functional units and processes described above under the control of the controller 52 by reading various programs and the OS from the sub-storage unit 56 and expanding them into a working area that the main storage unit 54 provides. It should be noted that the configuration similar to the job intermediate server 110 described above can be applied to the tablet device 126 and the smart phone device 140 while individual particular hardware elements are different.

The projector shown in FIG. 16 includes a controller 82 that includes a CPU, a main storage unit 84 such as RAM, a sub-storage unit 86 such as flash memory, an external storage device I/F 88, and a network I/F 90. The projector 136 includes an image displaying unit 92 and a control panel 94 that accepts key operations. The image displaying unit 92 is a displaying unit that outputs a code image and displays an image on a screen using devices such as liquid crystal, DLP, and Liquid Crystal On Silicon (LCOS). The projector 136 implements functional units and processes described above under the control of the controller 82 by reading various programs and the OS from the sub-storage unit 86 and expanding them into a working area that the main storage unit 84 provides.

It should be noted that a liquid crystal display, an organic EL display, a plasma display, a rear projection display that receive data to be projected/displayed via a network and accept a command to project/display can also be used instead of the video projector described above in this embodiment.

In the above description, the connecting information that includes the session ID, the schema information, the device type information, and the access information is displayed as a code image on the display or the screen. However, it is not restricted to displaying the connecting information. For example, if the electronic device has a printing capability like the MFP 134, the code image that encodes the connecting information can also be printed on paper.

Alternatively, the connecting information can be output with noncontact wireless method such as Radio Frequency IDentification (RFID) instead of outputting the connecting information in format of a code image. In noncontact wireless communication, the session ID is output in format of wireless signal that encodes the session ID. In this case, the terminal device 140 includes a wireless scanning unit that scans an output wireless signal such as a RFID reader instead of an image capturing unit such as a camera. The code reading unit 254 analyzes data signal acquired from the wireless signal and decodes the connecting information.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Further, any of the above-described devices or units can be implemented as a hardware apparatus, such as a special-purpose circuit or device, or as a hardware/software combination, such as a processor executing a software program.

Moreover, the illustrated server apparatuses are only illustrative of one of several computing environments for implementing the embodiments disclosed herein. For example, in some embodiments, the server apparatus functioning as the job intermediate server includes a plurality of computing devices, e.g., a server cluster, that are configured to communicate with each other over any type of communications link, including a network, a shared memory, etc. to collectively perform the processes disclosed herein.

In one example, the server may be implemented by a server apparatus connected to an electronic device and a terminal device. The server apparatus includes: a management unit to manage identification information assigned to the electronic device; a registration request receiving unit to receive the identification information that the terminal device reads from the electronic device and a request to register a request to process sent from the terminal device; a registering unit to register the received request to process in association with the identification information in response to the request to register; an acquisition request receiving unit to receive the identification information output by the electronic device and an acquisition request to acquire a request to process sent from the electronic device; and a sending unit to send the request to process associated with the received identification information to the electronic device in response to the acquisition request and have the electronic device process the request to process.

In another example, the server apparatus further includes: an encoded information generating unit to generate encoded information encoding the identification information given to the electronic device; and an encoded information sending unit to send the encoded information to the electronic device and have the electronic device output the encoded information in a format in which the identification information is readable.

In another example, the management unit manages expiration dates of the identification information given to the electronic device, and the registering unit does not register a registration request with expired identification information.

In another example, the present invention may reside in: a request processing system that includes an electronic device, a server apparatus, and a terminal device connected via a network. The electronic device includes: an output unit to output identification information assigned to the electronic device in a readable format; an acquisition request sending unit to send the identification information assigned to the electronic device and a request for acquiring a processing request to the server apparatus; and a request processing unit to process the processing request acquired from the server apparatus. The terminal device includes: a reading unit to read the identification information output by the electronic device; and a registration request sending unit to send the read identification information and a registration request for registering the processing request to the server apparatus. The server apparatus includes: a registering unit to register the processing request in association with the identification information included in the registration request in response to the registration request; and a sending unit to send the processing request associated with the identification information included in the acquiring request in response to the acquiring request.

In one example, the terminal device further includes a determining unit to determine an application to be started up based on the information that describes a capability of the electronic device read from the electronic device with the identification information.

In one example, the present invention may reside in a method of processing a request in a system including an electronic device, a server apparatus, and a terminal device connected via a network. The method includes: outputting identification information assigned to the electronic device in a form readable by the operation device; sending the identification information to be output and a request to acquire a request to process to the server apparatus; processing the request to process acquired from the server apparatus; reading the identification information output by the electronic device; sending the read identification information and a request to register the request to process to the server apparatus; registering the request to process associated with the identification information included in the request to register in response to the request to register; and sending the request to process associated with the identification information included in the request to acquire in response to the request to acquire.

In another example, the method further includes determining an application to be started up based on the information that describes the capability of the electronic device read from the electronic device with the identification information.

In one example, the present invention may reside in a server configured to connect to an operation apparatus provided on a first network and to one or more electronic apparatuses provided on a second network, the first network being different from the second network. The server includes: a request receiving unit to receive, from the operation apparatus, a processing request regarding a process to be executed using one of the one or more electronic apparatuses, and identification information for identifying the electronic apparatus to be used for executing the process, the identification information being obtained by the operation apparatus directly or indirectly from the electronic apparatus; a storing unit to store the processing request in association with the identification information for identifying the electronic apparatus to be used for executing the process; and a processing request sending unit to send, in response to a request received from the electronic apparatus to be used for executing the process, information relating to the processing request associated with the identification information for identifying the electronic apparatus to the electronic apparatus that sent the request.

For example, the request receiving unit may correspond to the communication unit 210, which may be implemented by the network interface 60. The storing unit may correspond to the data storage unit 222, which may be implemented by any desired storage area such as the main storage unit 54, sub-storage unit, external storage device I/F 58, etc. The storing unit may alternatively or additionally correspond to the registration processing unit 216, which stores data in the data storage unit 222, and implemented by a set of instructions received from the CPU of the controller 52 that operates in cooperation with the memory area, or an ASIC. The processing request sending unit may correspond to the communication unit 210, which operates in cooperation with the transmit processing unit 214. The communication unit 210 may be implemented by the network interface 60. The transmit processing unit 214 may be implemented by a set of instructions received from the CPU of the controller 52, which operates in cooperation with the network interface.

In one example, the information relating to the processing request causes the electronic apparatus to execute at least a part of the process based on the processing request.

In one example, the server further includes an identification generating unit configured to generate the identification information for identifying the electronic apparatus to be used for executing the process, in response to a request received from the electronic apparatus. The request received from the electronic apparatus may be, for example, a request for image data generated based on the identification information, such as a request for menu screen. The electronic apparatus receives the identification information from the server. The electronic apparatus, which receives the identification information, may output the identification information in a form such that the operation apparatus is able to directly or indirectly obtain.

For example, the identification information generating unit may correspond to the session ID generating unit 218, which may be implemented by a set of instructions received from the CPU of the controller 52. In response to a request received from the electronic apparatus, the session ID may be generated, which may be one example of connecting information. The session ID identifies a session, that is, a series of communications that may be performed between at least the server and the electronic apparatus, for example, from generation of a request for the identification information to execution of the processing request.

In alternative to generating the identification information at the server, the electronic apparatus may generate the identification information, and send the identification information to the server to be managed.

The server may further include an identification information management unit, which may correspond to the session management unit 220, to store the identification information for the electronic apparatus that the server is communicating with, such as the electronic apparatus that the server receives a request from.

The identification information may be encoded with additional information to generate encoded information. Encoding may be performed by any desired apparatus or system, such as the server or the electronic apparatus.

The identification information, or the encoded information, may be obtained by the operation apparatus directly or indirectly from the electronic apparatus. For example, the identification information, or the encoded information, may be output in the form of an image being displayed on any desired object. Examples of the object on which the image of the identification information or the encoded information can be displayed include, but not limited to, any screen of any desired electronic apparatuses including personal assistance devices, a physical object such as a wall, a whiteboard, or glasses, a medium such as air (for example, in case of 3-dimensional image), and a recording medium such as paper, label, seal, or sticker. For example, in case the electronic apparatus is used within the private area such as within the office, the electronic apparatus may be previously provided with a mark or a sticker with the image of the identification information or the encoded information. In such case, the operation apparatus can obtain the identification information from the electronic apparatus, by reading or recognizing the image of the identification information or the encoded information. Alternatively, the image of the identification information for identifying the electronic apparatus may be previously printed out or stored as electronic data in a manner, such that the identification information is associated with the electronic apparatus. In such case, a user may obtain the identification information associated with the electronic apparatus that the user desires to request, using the operation device.

In another example, the identification information, or the encoded information, may be output in the form of signal, which can be received by the operation apparatus, such as non-contact wireless communication.

In another example, the present invention may reside in an electronic apparatus provided on a second network different from a first network and to connect to a server system. The electronic apparatus includes: an output device configured to output identification information for identifying the electronic apparatus in a form that allows an operation apparatus provided on the first network to directly or indirectly obtain; and an acquisition request sending unit configured to send a request for acquiring a processing request regarding a process to be executed using the electronic apparatus and the identification information for identifying the electronic apparatus.

In one example, the output device includes an identification generating unit to generate the identification information for identifying the electronic apparatus, in response to a request received from the operation apparatus. The identification information may be sent to the server system.

In one example, the output device outputs encoded information generated based on the identification information for identifying the electronic apparatus in the form obtainable by the operation apparatus.

In another example, the electronic apparatus includes an encoded information generating unit configured to encode the identification information for identifying the electronic apparatus with additional information to generate the encoded information.

In another example, in the electronic apparatus, outputting the encoded information in the form obtainable by the operation apparatus is performed concurrently with sending the request with the identification information for identifying the electronic apparatus to the server apparatus.

In another example, the present invention may reside in a non-transitory recording medium which, when executed by one or more processors, cause the processors to perform a method of processing a request using one of one or more electronic apparatuses provided on a first network. The method includes: receiving, from an operation apparatus provided on a second network different from the first network, a processing request regarding a process to be executed using the one of one or more electronic apparatuses, and identification information for identifying the electronic apparatus to be used for executing the process, the identification information being obtained by the operation apparatus directly or indirectly from the electronic apparatus; storing the processing request in association with the identification information for identifying the electronic apparatus to be used for executing the process; and sending, in response to a request received from the electronic apparatus to be used for executing the process, information relating to the processing request associated with the identification information for identifying the electronic apparatus to the electronic apparatus that sent the request.

In another example, the present invention may reside in a server system including one or more processors, which operate in cooperation with an electronic apparatus provided on a first network and configured to connect with the server system. The processors cooperatively configured to: receive, from an operation apparatus provided on a second network different from the first network, a processing request regarding a process to be executed using the one of one or more electronic apparatuses, and identification information for identifying the electronic apparatus to be used for executing the process, the identification information being obtained by the operation apparatus directly or indirectly from the electronic apparatus; store the processing request in association with the identification information for identifying the electronic apparatus to be used for executing the process; and send, in response to a request received from the electronic apparatus to be used for executing the process, information relating to the processing request associated with the identification information for identifying the electronic apparatus to the electronic apparatus that sent the request.

Further, while the above-described example embodiments are based on presumption that the server is provided so as to facilitate communications between the electronic apparatus and the operation apparatus that reside on different networks, application of the example embodiments may not be limited to such network environments. For example, if the user desires to apply the example embodiments to the other network environment in which the electronic apparatus and the operation apparatus can directly communicate with each other, the example embodiments may be applicable.

What is claimed is:
1. A system, comprising:
an electronic apparatus including first circuit; and
a server including second circuitry configured to:
  receive, from a mobile device, a processing request that the electronic apparatus perform a process, and identification information identifying the electronic apparatus;
  receive, from the electronic apparatus, an acquisition request to acquire the processing request; and
  transfer the processing request to the electronic apparatus in response to the received acquisition request, wherein
the first circuitry is configured to:
  display an image including the identification information of the electronic apparatus;
  transfer the acquisition request to the server to acquire the processing request that the electronic apparatus perform the process while the image including the identification information of the electronic apparatus is displayed, wherein the acquisition request is transferred regularly while the image is displayed, and Wherein when an another image, different from the image including the identification information of the electronic apparatus is displayed, the first circuitry does not transfer the acquisition request to the server; and perform the process based on the processing request transferred by the server in response to the acquisition request, wherein the second circuitry is further configured to
receive, from the electronic apparatus, a request for screen data that defines a displaying screen to display the image; and
transfer a response to the request for the screen data to the electronic apparatus, the response including the screen data, and the first circuitry is further configured to
send the request for the screen data to the server;
receive the response to the sent request for the screen data from the server;
generate a code image based on the screen data included in the response, the code image including device capability information describing capabilities of the electronic apparatus, session identification, and the identification information of the electronic apparatus; and
display the code image.

2. The system of claim 1, wherein
the second circuitry is further configured to generate the image including the identification information, in response to the acquisition request received from the electronic apparatus, and the electronic apparatus receives the image from the server.

3. The system of claim 1, wherein the electronic apparatus, in response to receiving information relating to the processing request, executes at least a part of the process based on the processing request.

4. The system of claim 1, wherein the identification information includes communication identification information that identifies communication established at least between the electronic apparatus and the server.

5. The system of claim 1, wherein the server further includes a memory to store the identification information identifying the electronic apparatus.

6. The system of claim 1, wherein the server further includes a memory to store expiration information indicating an expiration of the identification information, and
the second circuitry does not transfer the processing request received from the mobile device to the electronic apparatus when the identification information received from the mobile device is expired.

7. The system of claim 1, wherein
the second circuitry is further configured to encode the identification information identifying the electronic apparatus with additional information to generate the image; and
the second circuitry is further configured to send the image to the electronic apparatus, wherein the electronic apparatus displays the image.

8. The system of claim 7, wherein the additional information includes at least one of schema information, capability information describing a capability of the electronic apparatus, and information allowing access to the server.

9. The system of claim 7, wherein the second circuitry is further configured to transmit data, which causes the electronic apparatus to concurrently perform displaying the image, and sending the request with the identification information identifying the electronic apparatus to the server.

10. The system of claim 1, wherein the identification information is displayed in the form of an image obtainable by the mobile device.

11. The system of claim 1, wherein the image includes one of a one-dimensional code, a two-dimensional code, or a combination of the one-dimensional and two-dimensional codes.

12. The system of claim 1, wherein the first circuitry is further configured to encode the identification information identifying the electronic apparatus with additional information to generate the image.

13. The system of claim 1, wherein third circuitry of the mobile device is configured to:
obtain, from the electronic apparatus, the identification information identifying the electronic apparatus;
transmit, to the server, the processing request regarding the process to be executed by the electronic apparatus and the identification information identifying the electronic apparatus being obtained from the electronic apparatus; and
determine an application to be executed, based on capability information describing the capability of the electronic apparatus, the capability information being obtained from the electronic apparatus.

14. The system of claim 1, Wherein the first circuitry is further configured to transfer the acquisition request to the server to acquire the processing request that the electronic apparatus perform the process, only when the image including the identification information of the electronic apparatus is being displayed.

15. A method of performing a process requested in a processing request transferred from a mobile device to a server, the processing request including identification information of an electronic apparatus, the method performed by the electronic apparatus including first circuitry, the method comprising:
displaying, by the first circuitry, an image including the identification information of the electronic apparatus;
transferring, by the first circuitry, an acquisition request to the server, the acquisition request including the identification information, while the image including the identification information of the electronic apparatus is displayed, wherein the acquisition request is transferred regularly while the image is displayed, wherein when an another image, different from the image including that does not include the identification info of the electronic apparatus is displayed, the first circuitry does not transfer the acquisition request to the server;
receiving, by the first circuitry, the processing request from the server; and
performing, by the first circuitry, the process based on the processing request transferred by the server in response to the acquisition request,
wherein the method further comprises:
sending, by the first circuitry, a request for screen data that defines a displaying screen to display the image to the server;
receiving, by the first circuitry, a response to the sent request for the screen data from the server, the response including the screen data;
generating, by the first circuitry, a code image based on the screen data included in the response, the code image including device capability information describing capabilities of the electronic apparatus, session identification, and the identification information of the electronic apparatus; and
displaying the code image.

16. The method of claim 15, further comprising:
generating, by second circuitry of the server connected to the electronic apparatus, the identification information of the electronic apparatus, in response to the acquisition request received from the electronic apparatus.

17. The method of claim 15, further comprising:
executing, by the first circuitry, at least a part of the process based on the processing request, and the information relating to the processing request transferred to the electronic apparatus.

18. The method of claim 15, further comprising:
receiving, by second circuitry of the server connected to the electronic apparatus from the mobile device, the processing request that the electronic apparatus perform the process, and the identification information of the electronic apparatus;
receiving, by the second circuitry, the acquisition request from the electronic apparatus to acquire the processing request; and
transferring, by the second circuitry, the processing request to the electronic apparatus in response to the received acquisition request.

19. An electronic apparatus for processing a process requested in a processing request transferred from a mobile device to a server, the processing request including identification information of an electronic apparatus, the electronic apparatus connected to the server, the electronic apparatus comprising:
circuitry configured to:
display an image including the identification information of the electronic apparatus;
transfer an acquisition request to the server, the acquisition request including the identification information, while the image including the identification information of the electronic apparatus is displayed, wherein the acquisition request is transferred regularly while the image is displayed, wherein when an another image, different from the image including the identification information of the electronic apparatus is displayed, the circuitry does not transfer the acquisition request to the server;
receive the processing request from the server; and
perform the process based on the processing request received from the server in response to the acquisition request,
wherein the circuitry is further configured to
send a request for screen data that defines a displaying screen to display the image the server;
receive a response to the sent request for the screen data from the server, the response including the screen data;
generate a code image based on the screen data included in the response, the code image including device capability information describing capabilities of the electronic apparatus, session identification, and the identification information of the electronic apparatus; and
display the code image.

\* \* \* \* \*